(12) United States Patent
Konop et al.

(10) Patent No.: US 7,642,665 B2
(45) Date of Patent: Jan. 5, 2010

(54) PORTABLE GENERATOR HOUSING

(76) Inventors: Chad O. Konop, 1940 Westbreeze Dr., Oshkosh, WI (US) 54904; Daniel J. Petrazak, 285 Mound St., Berlin, WI (US) 54923

( * ) Notice: Subject to any disclaimer, the term of this patent is extended or adjusted under 35 U.S.C. 154(b) by 151 days.

(21) Appl. No.: 11/840,764

(22) Filed: Aug. 17, 2007

(65) Prior Publication Data

US 2008/0042625 A1 Feb. 21, 2008

Related U.S. Application Data

(60) Provisional application No. 60/822,933, filed on Aug. 19, 2006, provisional application No. 60/822,934, filed on Aug. 19, 2006.

(51) Int. Cl.
  *F03B 63/04* (2006.01)
  *H02K 7/18* (2006.01)
  *F02B 63/00* (2006.01)
  *B60P 7/02* (2006.01)

(52) U.S. Cl. ............................. 290/1 A; 290/22; 123/2; 296/100.06; 296/100.01

(58) Field of Classification Search ............... 290/40 B, 290/1 A, 1 B, 2, 4 R; 322/1; 296/24.4, 100.1, 296/100.07, 100.06; 123/2
  See application file for complete search history.

(56) References Cited

U.S. PATENT DOCUMENTS

| 2,038,932 | A | * | 4/1936 | Haupt | 296/100.07 |
|---|---|---|---|---|---|
| 4,136,432 | A | * | 1/1979 | Melley, Jr. | 29/469 |
| 4,556,247 | A | * | 12/1985 | Mahaffey | 322/1 |
| 4,759,560 | A | * | 7/1988 | Virgulti | 280/47.26 |
| 4,835,405 | A | * | 5/1989 | Clancey et al. | 290/1 A |
| 5,253,891 | A | * | 10/1993 | Carlin et al. | 280/422 |
| 5,328,199 | A | * | 7/1994 | Howe | 280/477 |
| 5,624,589 | A | * | 4/1997 | Latvis et al. | 219/133 |
| 5,734,148 | A | * | 3/1998 | Latvis et al. | 219/133 |
| 6,894,625 | B1 | * | 5/2005 | Kozma et al. | 340/950 |
| 2004/0011918 | A1 | * | 1/2004 | Musial et al. | 244/1 R |
| 2005/0151374 | A1 | * | 7/2005 | Ambrose | 290/1 A |
| 2006/0157987 | A1 | * | 7/2006 | Albrecht | 290/1 A |

* cited by examiner

*Primary Examiner*—Julio Gonzalez
(74) *Attorney, Agent, or Firm*—Alan R. Stewart; Godfrey & Kahn, S.C.

(57) ABSTRACT

A portable genset with an engine driving a generator mounted to a frame and positioned within an enclosure. The enclosure includes front and rear hoods that are hingedly mounted adjacent opposite ends of the genset. The hoods may be hinged open to permit access to either of the engine or the generator. The genset may also include a tongue with a hitch mounted an outer end permitting the genset to be towed. The tongue may be movable between an extended position and a generally vertical position.

10 Claims, 24 Drawing Sheets

FIG. 17
FIG. 18
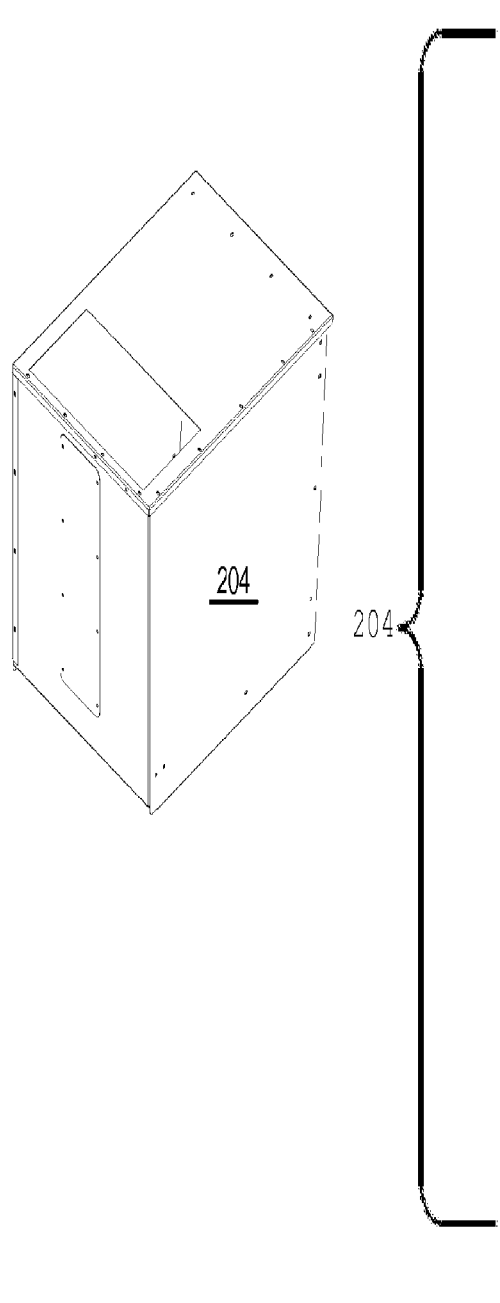
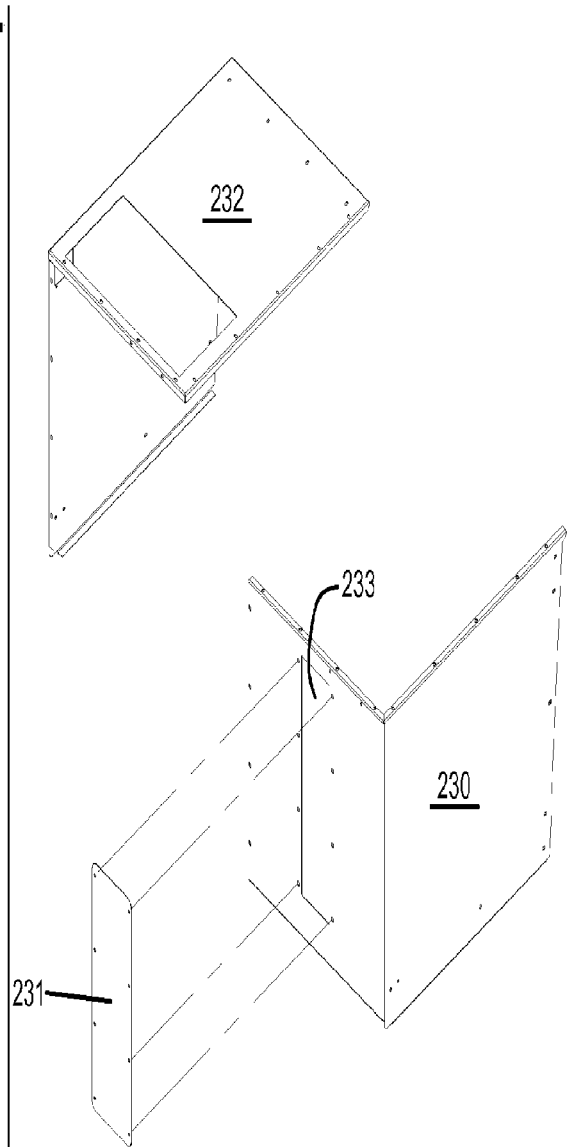

FIG. 19
FIG. 20
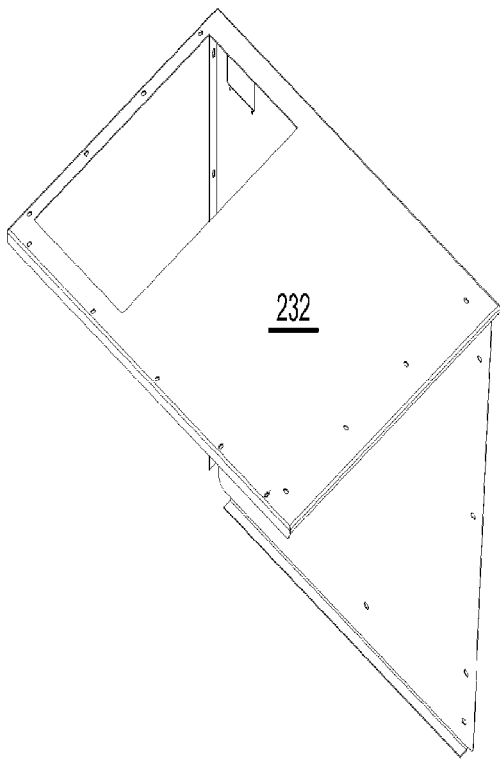
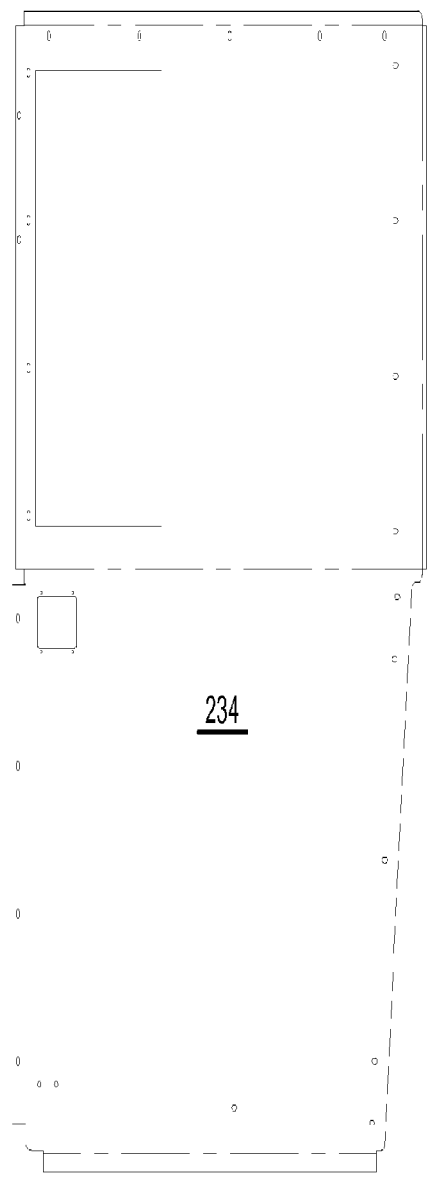

FIG. 23
FIG. 24
FIG. 25
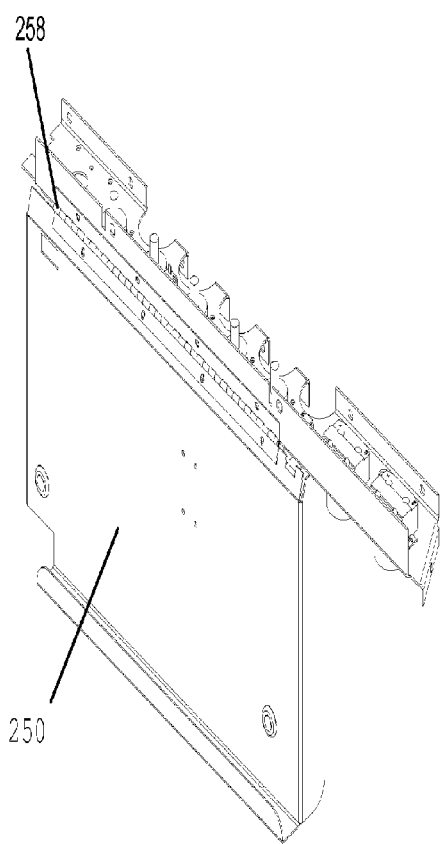
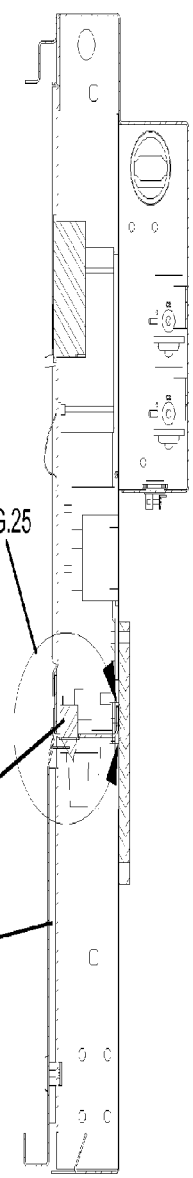
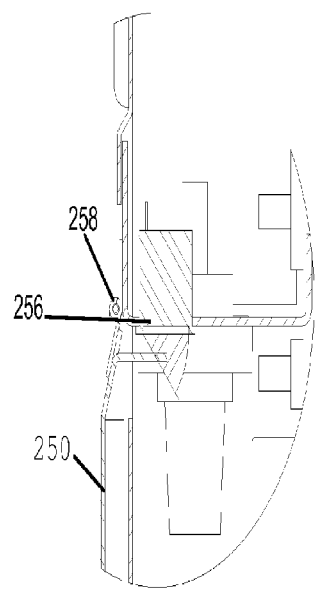

PORTABLE GENERATOR HOUSING

CROSS-REFERENCE TO RELATED APPLICATIONS

The present application claims priority of earlier filed U.S. Provisional Patent Applications 60/822,933 and 60/822,934, filed on Aug. 19, 2006, the disclosures of which are incorporated herein by reference.

BACKGROUND

Conventional portable generator sets, or gensets, to provide temporary electrical power at remote locations, construction sites, emergency response sites or other locations requiring such power are well known. Such conventional portable generators might by small person-portable devices or they may be larger skid or trailer mounted devices, depending on the site requirements and location, and the amount of power that is needed for a particular use. Often these conventional portable generators are mounted within a removable shroud or cover, so that the shroud blocks and/or helps attenuate sound emanating from the engine or other equipment within the genset.

Often, gensets are configured to be towable, with one or more axles and a tongue extension for attaching to a hitch mounted on a towing vehicle. However, the overall length of the genset and tongue may be too long for efficient transportation on other vehicles, such as transportation on a flat bed trailer, or on other road vehicles. The overall length of the genset and tongue preferably should not be shortened to much to ensure proper tracking of the trailer. Improvements to trailer mounted gensets are desirable to balance the length needed for efficient towing and maneuverability when towed, while permitting a greater density of gensets to be carried on other vehicles.

Gensets, like almost all devices with an internal combustion engine, require periodic maintenance to continue operating a peak efficiency and/or capacity. The generators may also require periodic maintenance for optimal operation. Some of these maintenance functions may be carried out in the field and others may be scheduled for a time when the genset has been returned to a maintenance facility.

Housings for conventional gensets may inhibit access to the engine and the generator of these gensets, making both field maintenance and more comprehensive maintenance more difficult and time consuming. Conventional gensets may also include housing which are made of a plurality of individual elements that must be joined together. Reducing the number of elements comprising the housing may provide cost advantages in the manufacture of housing for gensets and be simpler and faster to assemble and maintain.

Improvements to housings for portable gensets are desirable.

Portable gensets may be adaptable to be switchable between different voltages and/or phases of output. However, while ease of switching between phases and voltages is desirable, switching under load can damage equipment connected to the genset, and also may damage the generator. It is often desirable to only connect or disconnect equipment from the genset when the genset is not under load or when power delivery to the output lugs has been interrupted.

Improvements to limit the access to and the safety of phase switching and power output lugs are desirable.

In gensets, often wiring and controls may be spread about the interior of the housing into apparently convenient locations, such as having the engine operation and management control components directly adjacent the engine. However, having a dispersed arrangement of wiring and other components may be less than advantageous for assembly during manufacture and maintenance. Improvements to the location and arrangement of components and wiring within gensets are desirable.

Engines from a variety of different manufacturers may be used to power different gensets of the same rated capacity or may be used in the same model genset. While these different engines may have the same or similar horsepower ratings and be similarly configured in terms of fuel used, the layout of theses engines and how they interface with the generator and other equipment of the genset may be slightly different. It can be costly and inefficient to the manufacture of gensets to have a variety of different mounting arrangements for the generators and other equipment of the genset to adapt the genset to the configuration of each unique engine layout.

Improvements to the mounting of engines to gensets to minimize the changes that must be made to the genset to accommodate different engines are desirable.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the drawing figures is as follows:

FIG. 17 is a perspective view of a tilting access hood according to the present disclosure.

FIG. 18 is an exploded perspective view of the tilting access hood of FIG. 17.

FIG. 19 is a perspective view of a portion of the tilting hood of FIG. 17.

FIG. 20 is a panel layout of a sheet of suitable material for forming into the portion of FIG. 19 of the tilting hood of FIG. 17.

FIG. 23 is a perspective view of the second access door of FIG. 22 removed from the genset.

FIG. 24 is a side cross-sectional view of a portion of the genset control panel, showing safety cutoff switches on the second access door.

FIG. 25 is a closer side cross-sectional view of the safety cutoff switches of FIG. 24.

DETAILED DESCRIPTION

Figure 1:
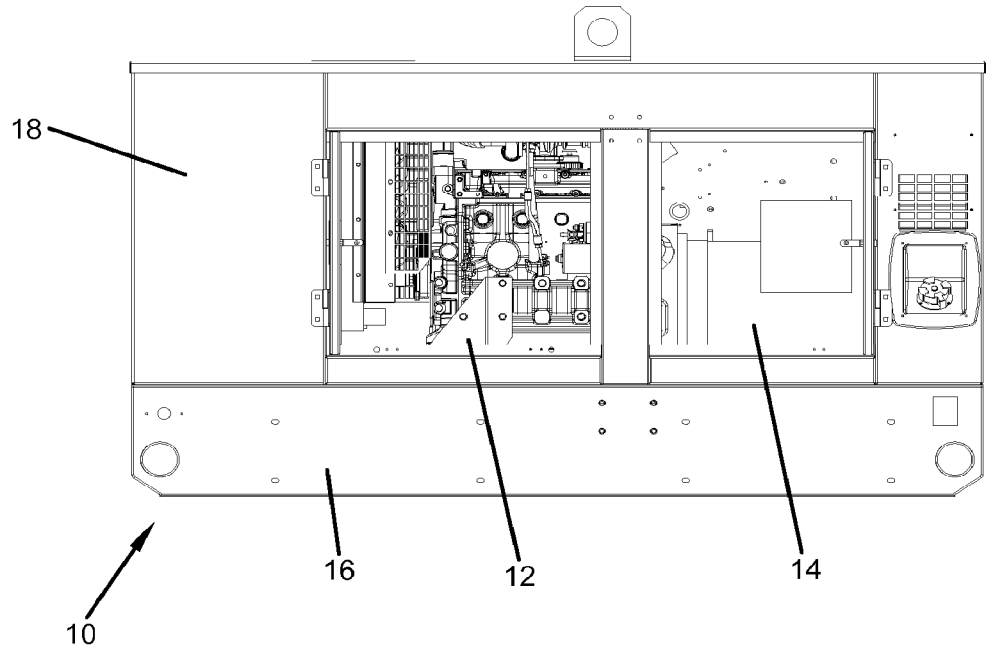
FIG. 1 is a first side view of a prior art generator set (genset) with a housing including access doors open to provide access into an interior of the housing.
Figure 2:
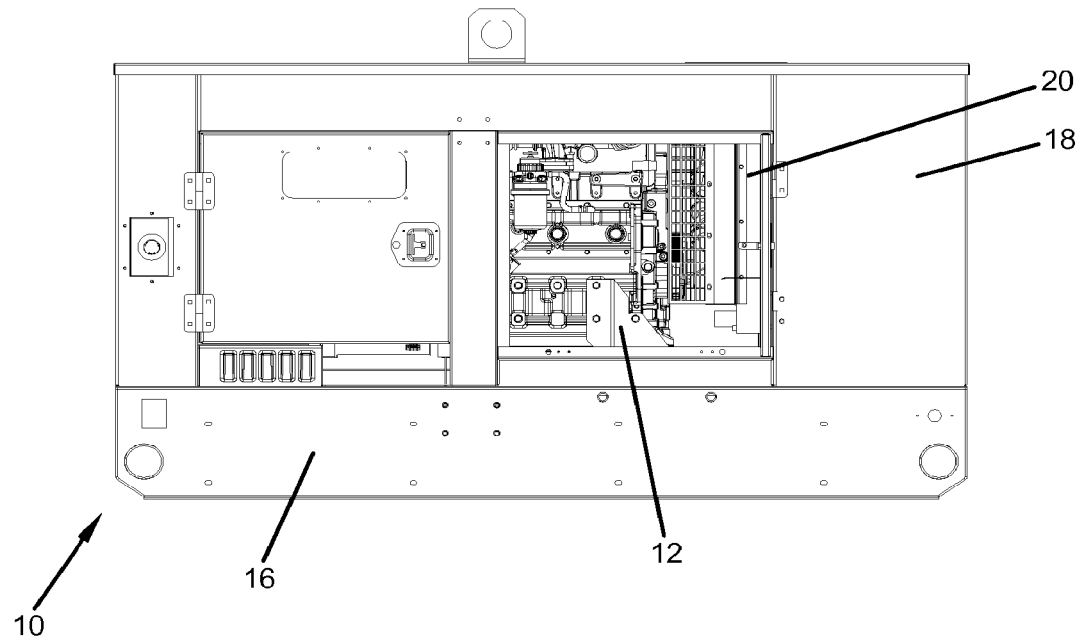
FIG. 2 is a second opposite side of the prior art genset of FIG. 1, showing a first access door open and a second access door closed.
Figure 3:
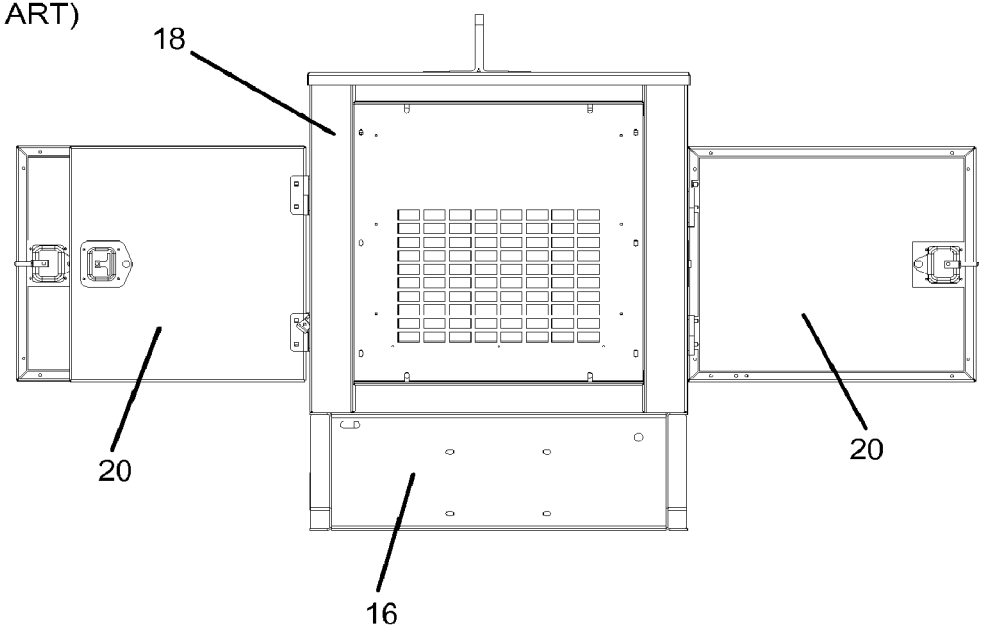
FIG. 3 is an end view of the prior art genset of FIG. 1.
Figure 4:
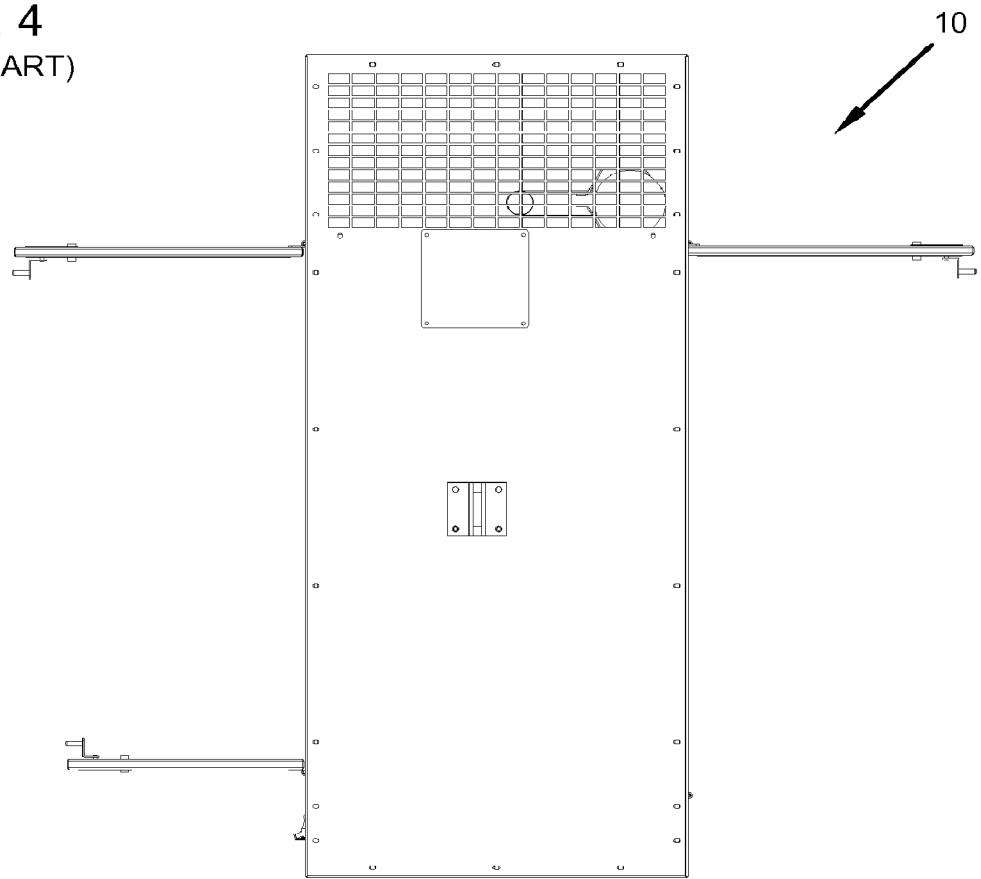
FIG. 4 is a top view of the prior art genset of FIG. 1.
Figure 5:
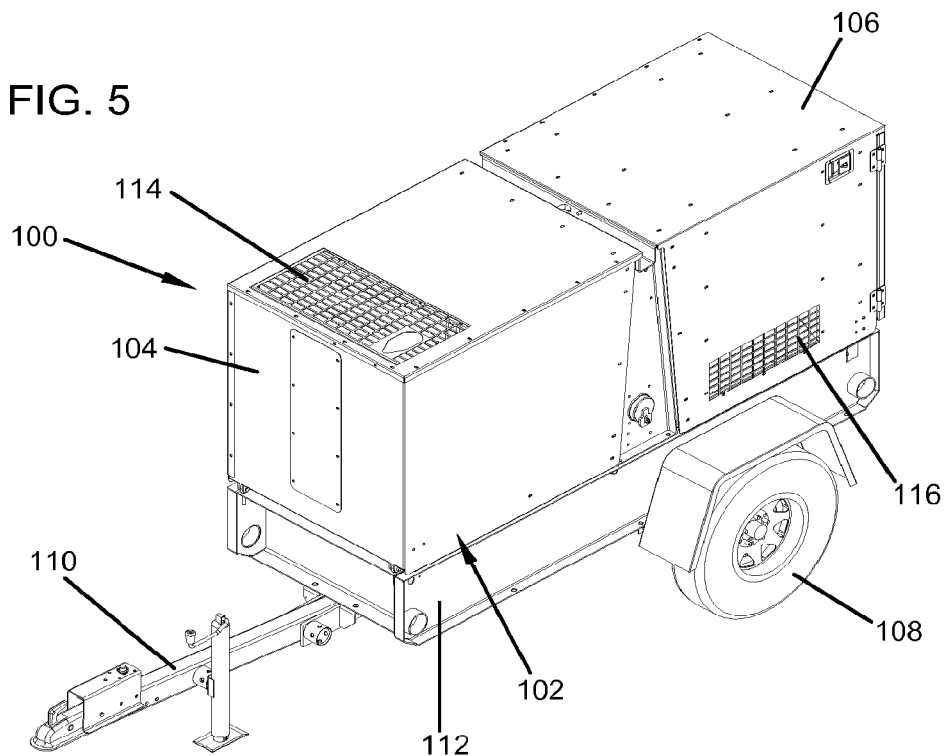
FIG. 5 is a front side perspective view of a genset according to the present disclosure.
Figure 6:
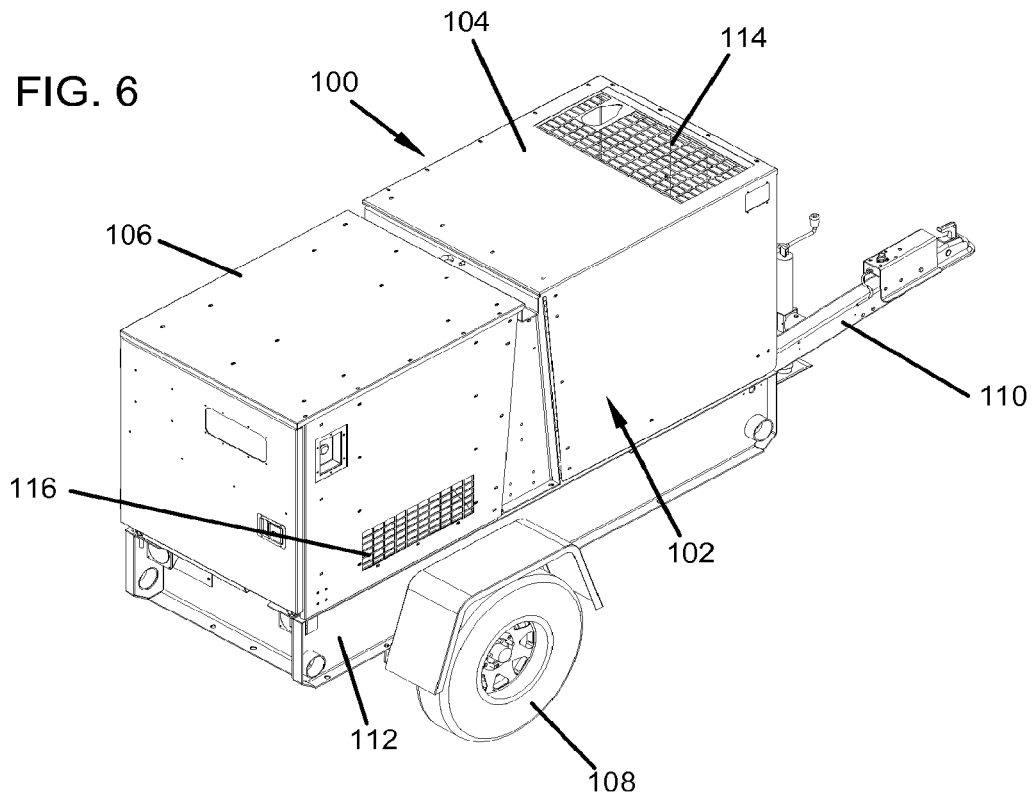
FIG. 6 is a rear side perspective view of the genset of FIG. 5.
Figure 7:
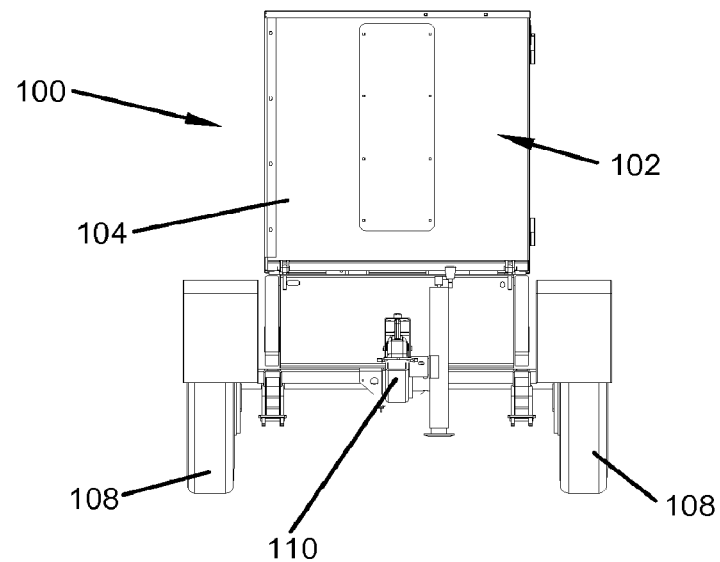
FIG. 7 is a front view of the genset of FIG. 5.
Figure 8:
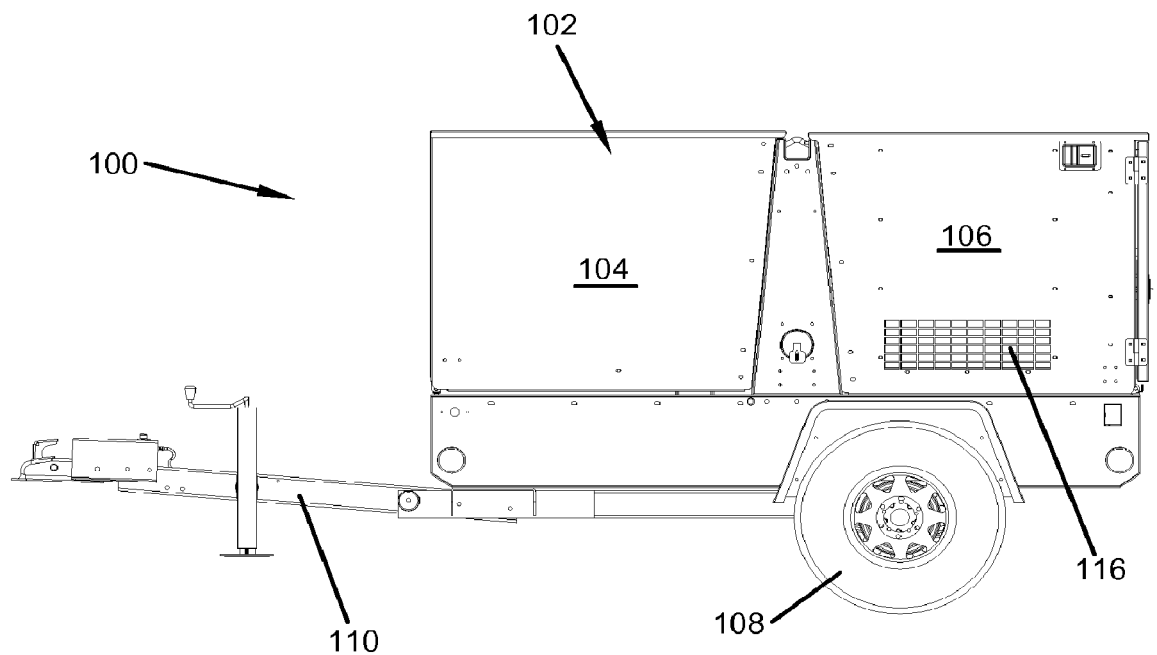
FIG. 8 is a first side view of the genset of FIG. 5.
Figure 9:
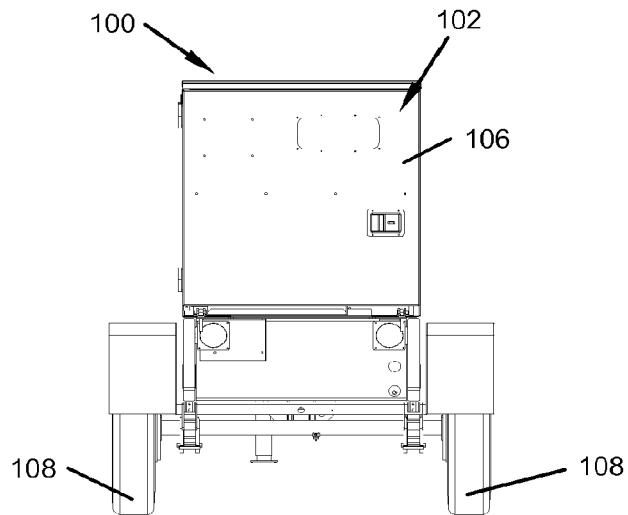
FIG. 9 is a rear view of the genset of FIG. 5.
Figure 10:
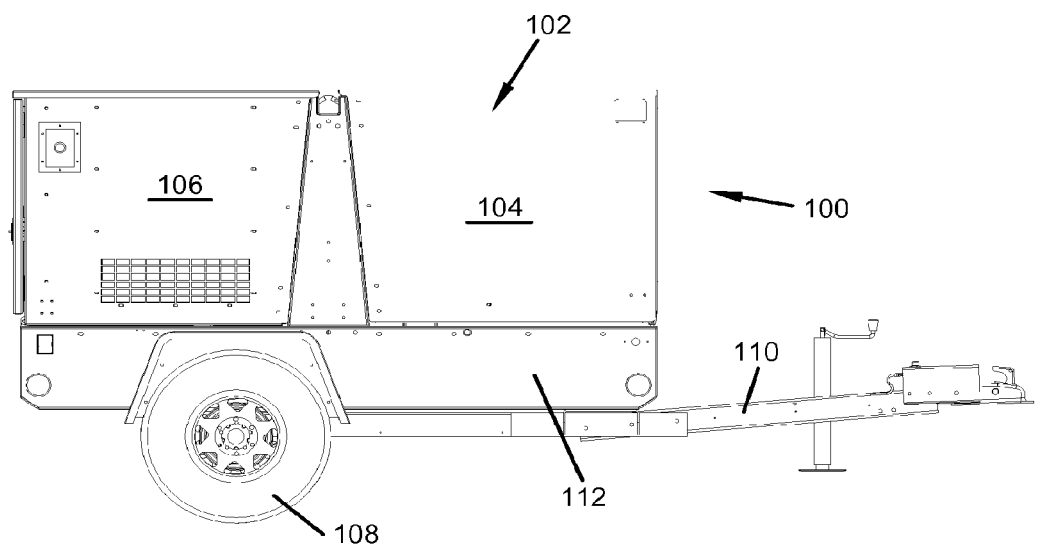
FIG. 10 is a second opposite side view of the genset of FIG. 5.
Figure 11:
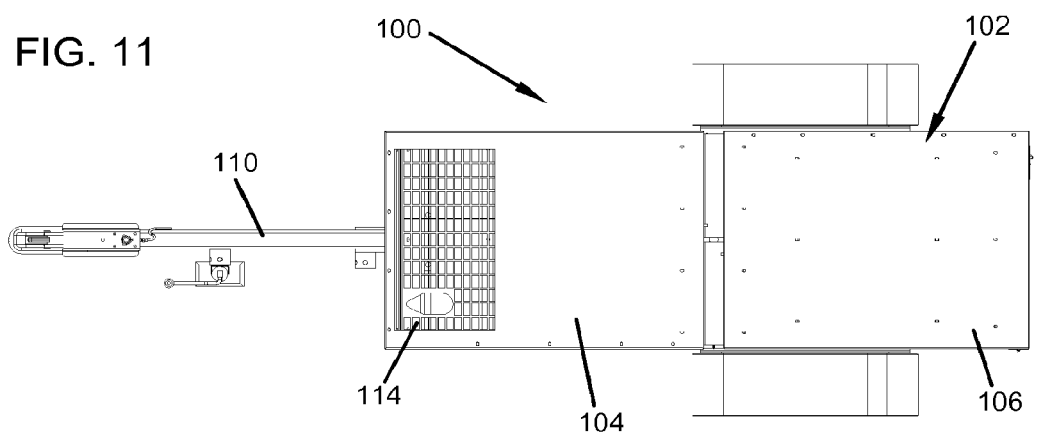
FIG. 11 is a top view of the genset of FIG. 5.

Generators and generator sets, hereinafter collectively referred to as gensets, generally encompass all portable or mobile electrical generators which may be mounted to a base frame and/or a trailer. While the gensets are described as mobile or portable, it is generally intended that the present disclosure relates to those units which are larger than person-portable units and may include very large units which are mounted to a movable base frame or chassis, whether or not that base frame or chassis incorporates wheels or other transportation features.

Prior art gensets, such as a genset 10 shown in FIGS. 1 to 4, may incorporate an internal combustion engine 12 of some nature connected to a generator 14. Engine 12 and generator 14 may be mounted to a frame 16 and enclosed within a housing 18. Housing 18 may include one or more doors 20 or panel openings about engine 12 and/or generator 14 to permit access to the engine or generator for inspection, maintenance or repair.

Doors 20 do permit some access to the interior of housing 18 but full access to the engine and generator is constrained by a fixed top 22 of housing 18, and lighting within housing 18 can be problematic, as a person accessing the interior through door 20 will be blocking ambient light entry through that same door 20. Removal of the engine or generator from the genset will often require that housing 18 be at least partially disassembled. Similarly, some forms of maintenance of the engine and generator may also require at least partial disassembly of the housing.

Referring now to FIGS. 5 to 11, a genset 100 according to the present disclosure is shown. Genset 100 includes a housing 102 with front hood 104 and rear hood 106. A pair of wheels 108, mounted to opposite ends of an axle 316, and a trailer tongue 110 are attached to a frame 112 to aid in the portability of genset 100. It is anticipated that genset 100 could be skid mounted instead of wheeled and the portability of genset 100 could be accomplished by crane and a suitable trailer or low-boy. Genset 100 includes an air outlet 114 in front hood 104 and one or more air inlets 116 in rear hood 106. Cooling air may be drawn into housing 102 through inlet 116, pulled across the components within the housing to cool them and expelled from the housing through outlet 114.

Figure 12:
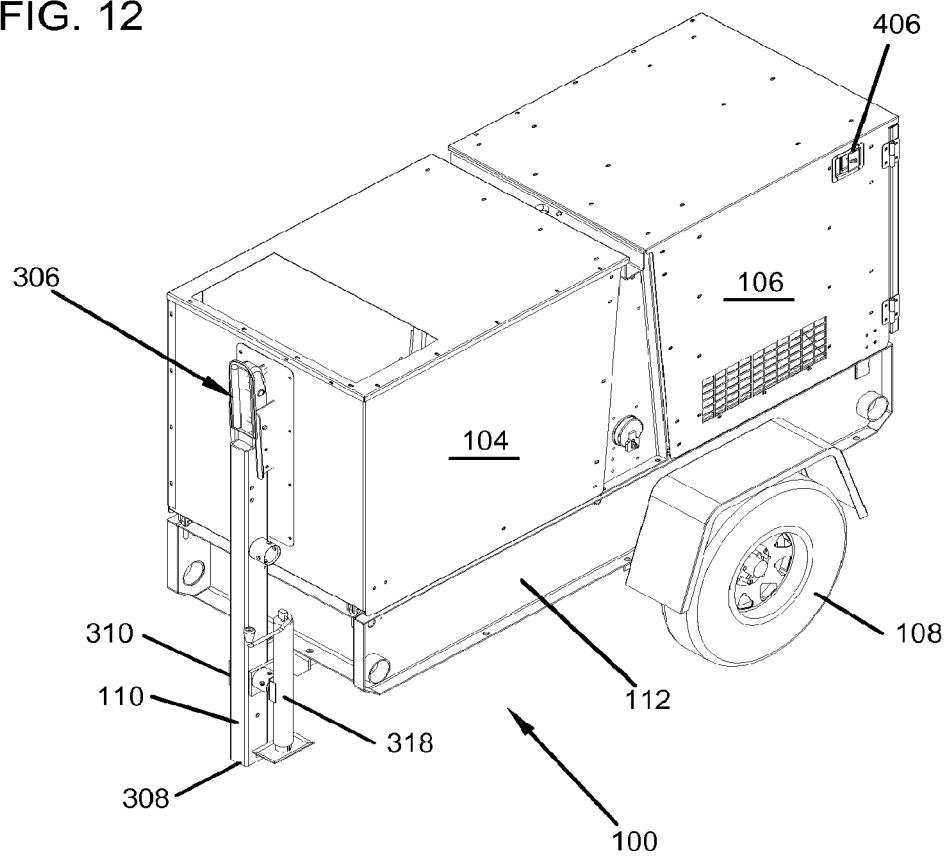
FIG. 12 is a front side perspective of the genset of FIG. 5, with the trailer tongue in a folded position.
Figure 13:
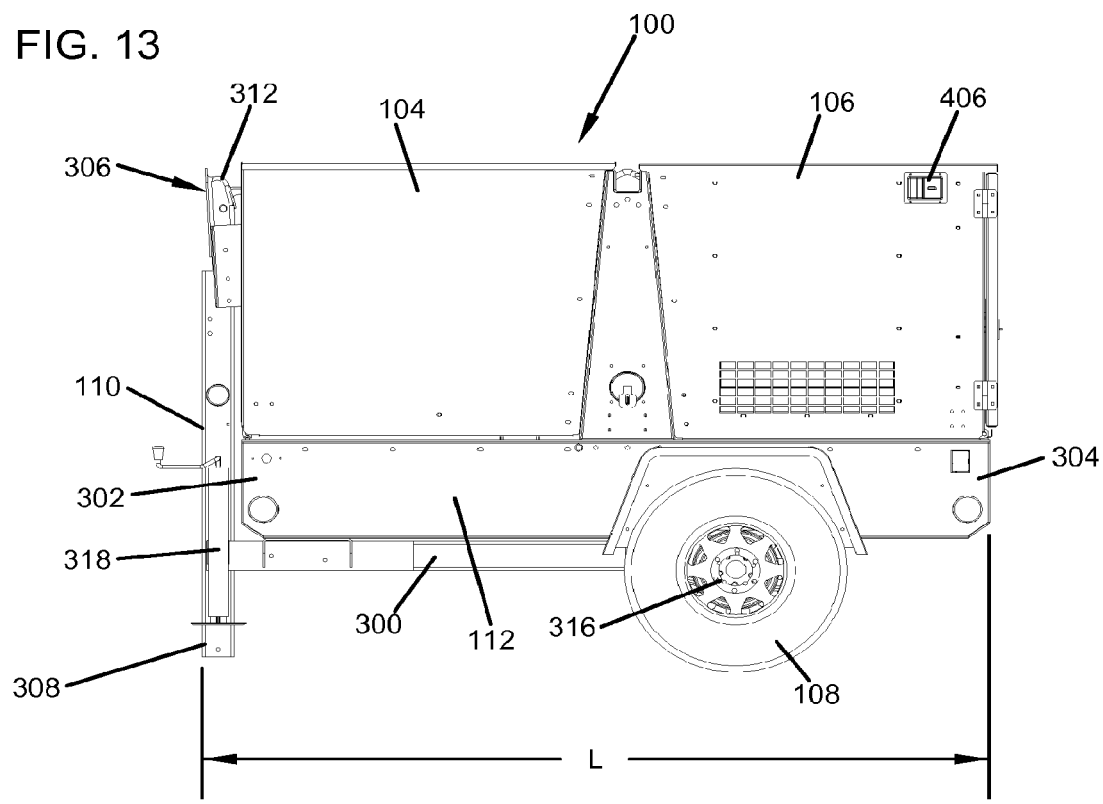
FIG. 13 is a side view of the genset of FIG. 12.

As shown in FIGS. 5 to 11, tongue 110 is illustrated in an first extended position to facilitate movement of genset 100. FIGS. 12 and 13 illustrate genset 100 with tongue 110 in a second folded or storage position. Individual gensets 100 may be trailed behind a variety of vehicles for movement between different locations. However, when movement of more than individual units is desired, the extension of tongue 110 may hinder the efficiency of loading and/or movement of the gensets. For example, if a dealer or customer has requested a plurality of units, the units may be shipped on a typical flat bed trailer behind a semi-tractor. When tongue 110 is in a towed position, as shown in FIGS. 5 to 11, the overall length of each genset 100 may be too great to load the gensets transversely on the trailer. In the U.S., a standard maximum width for transportation or movement on the public roads is 102 inches, before a special permit may be required. To maximize the number of gensets that may be transported together on a standard flat bed trailer, it is desirable that the overall length of the genset by lees than or equal to 102 inches. As shown in FIGS. 5 to 11, the genset it self may not be longer than the maximum vehicle width but the tongue may extend the length beyond this maximum dimension.

FIGS. 12 and 13 show tongue 110 folded so that a maximum length L of the genset and all of the various elements is less than or equal to the maximum allowable vehicle width. This will permit multiple gensets to be loaded side-by-side, transversely on the flat bed. In this way, the number of gensets that may be carried on a single flat bed trailer may be dramatically increased. Without this folding tongue length reduction, these gensets could only be carried generally arranged longitudinally on a standard trailer.

Tongue 110 is pivotably mounted to frame 112 adjacent a first end 302. Tongue 110 may be mounted to frame 112 by a pin 310 or some other similar or equivalent structure which permits pivotable movement between the extended and storage positions while maintaining connection between the tongue and the frame to permit towing of genset 100. As shown in FIG. 13, tongue 110 may be mounted to the frame via a separate towing subframe 300, or may be mounted directly to frame 112 if the frame includes an integral towing subframe. At a second opposite end 304 of frame 112, rear hood 106 permits access to controls for operation of the genset (as described below) regardless of the position of tongue 110. This ensures that genset 10 may be positioned as desired on a jobsite or elsewhere with tongue 110 in any desired position without impacting the usability of genset 100.

Also mounted adjacent first end 302 of frame 112 is a retractable jack 318. Jack 318 is positioned and configured to be able to support the front end of genset 100 when tongue 110 is not engaging any sort of support vehicle. Retracting jack 318 permits movement of genset 100 and extension of jack 318 to different lengths permits genset 100 to be leveled as needed on a particular jobsite or location of use.

Tongue 110 includes a first or outer end 306 to which is mounted a trailer hitch 312. Hitch 312 may any of a variety of conventional hitches and may be selected to match the weight of genset 100. A second or inner end 308 of tongue 110 may also be configured to provide a front genset support, albeit at a less adjustable height as compared to jack 318. Additional axles and sets of wheels may be added to frame 112 as needed to support the size and weight of genset 100. A second jack 318 may be mounted adjacent second end 304 of frame 112 to provide a rear support to genset 100.

For the remaining FIGS. 14 to 40, the various elements of genset 100 that adapt the genset towing have been removed for clarity. The features shown and described herein may be incorporated equally into towable and skid mounted gensets and it is not intended that the features be limited to any one version, style or size of portable genset.

Figure 14:
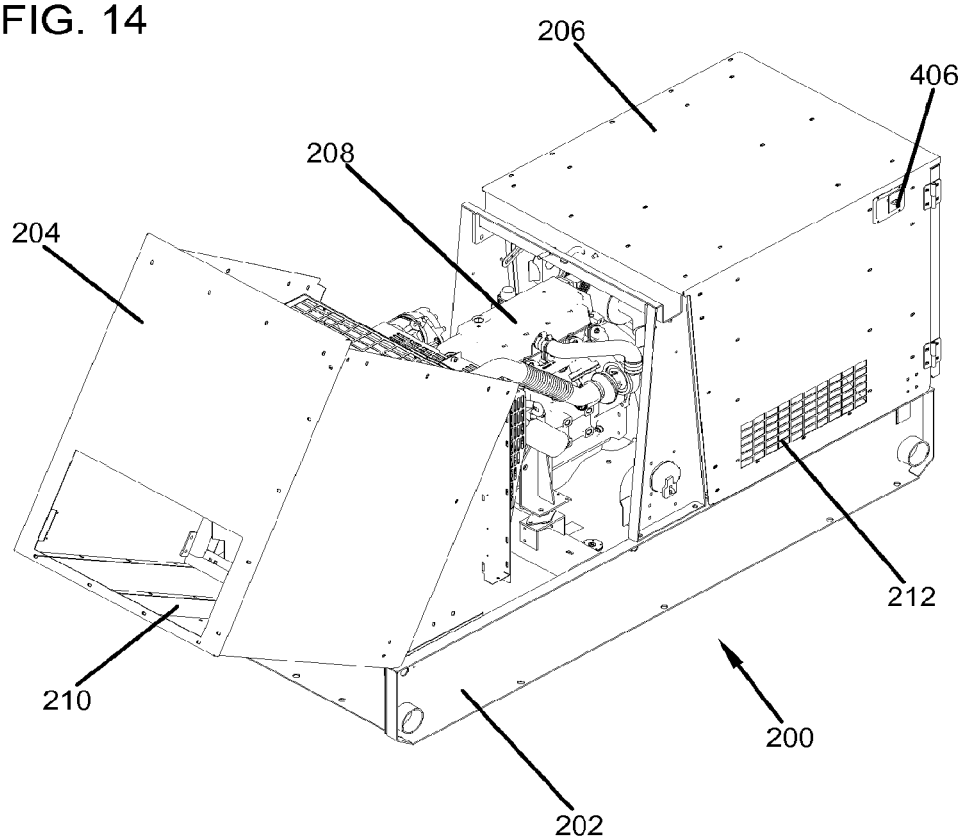
FIG. 14 is a front side perspective view of a genset according to the present disclosure with a housing including a first tilting access hood in an open position providing access into an interior of the housing.
Figure 15:
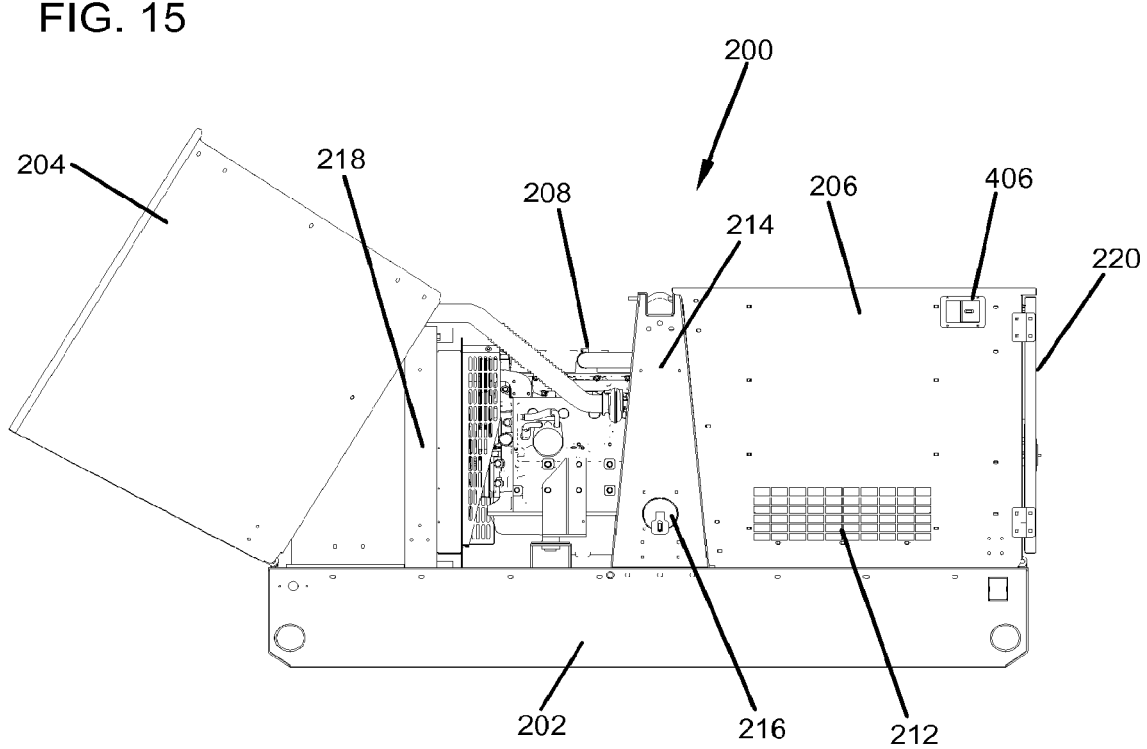
FIG. 15 is a side view of the genset of FIG. 14.

Referring now to FIGS. 14 and 15, a genset 200 includes a base frame 202 with a front tilting hood 204 and a rear tilting hood 206. Hood 204 is shown in an open position providing access to daily maintenance and inspection points for an engine 208 mounted in an interior of the housing. Front hood 204 includes an air outlet 210 where hot air from engine and generator cooling exits the interior of the housing. Rear hood 206 includes at least one air inlet 212 where air for cooling the engine and generator enters the interior before passing over the generator and the engine and being blown through a radiator 218. Alternatively, the air flow through the housing may be reversed to flow from front to rear.

Mounted between hoods 204 and 206 to base frame 202 is a central lifting arch structure 214. A fuel filling opening 216 is positioned as part of lifting arch 214 which provides support and protection to opening 216 and the cap and plumbing attached to opening 216. Previous fuel filling openings have been mounted to a side of the enclosure for filling a fuel tank mounted within base frame 202. With the arrangement of hoods 204 and 206, positioning of the fuel filling opening 216 on the central arch provides protection without interfering with the movement of hoods 204 and 206 providing access to the interior.

Underneath rear hood 206 is a generator. Typically, such generators do not require extensive daily maintenance or inspection and those elements requiring daily access can be reaching through arch 214 with hood 204 open as shown. When more extensive maintenance or inspection of the generator is required, hood 206 can be opened to provide full access to the generator and also may provide access to additional portions of engine 208. At a rear end of hood 206 is a control and power distribution panel 220.

Figure 16:
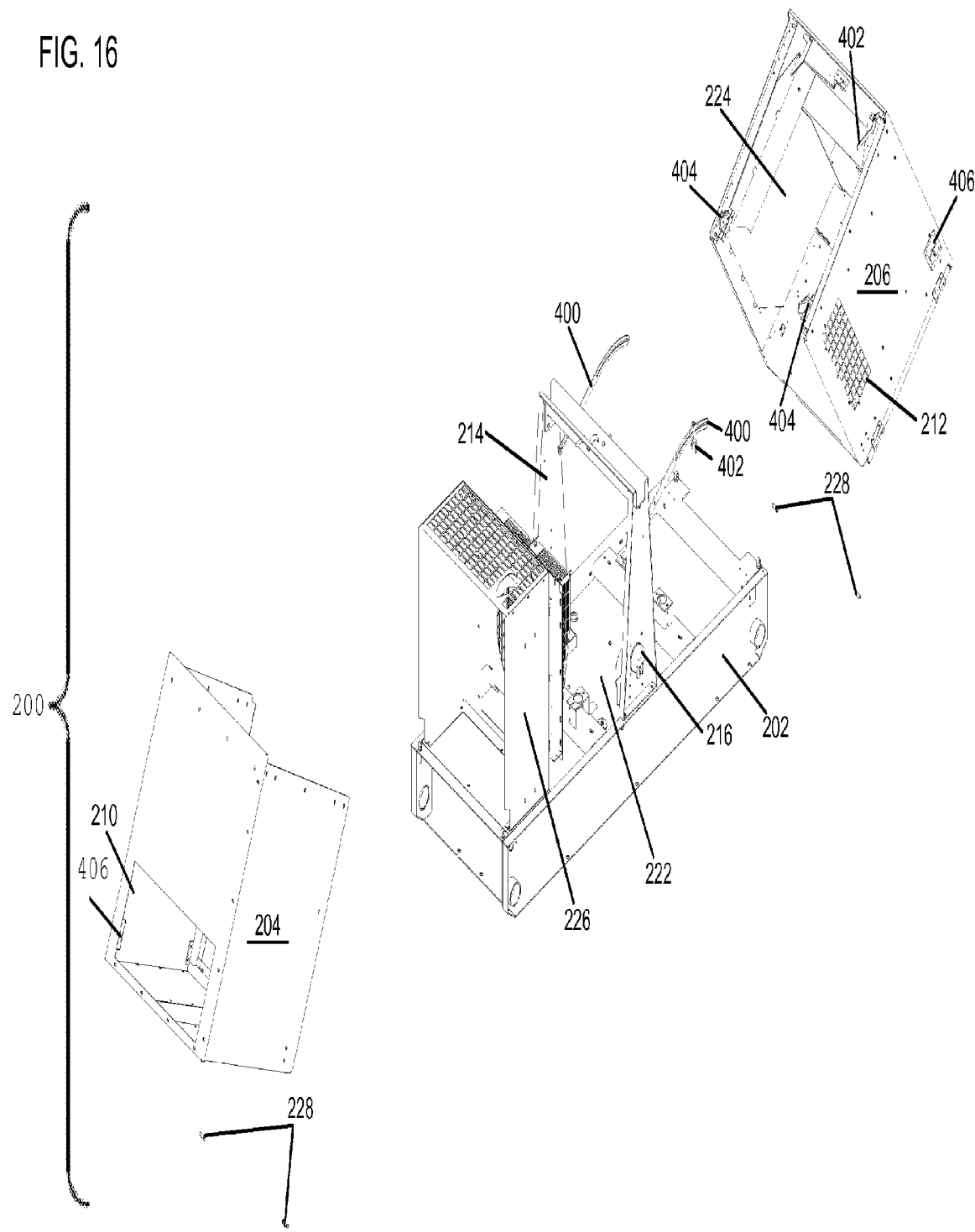
FIG. 16 is an exploded side perspective view of the genset of FIG. 14, with the engine and power generation components removed.
Figure 16A:
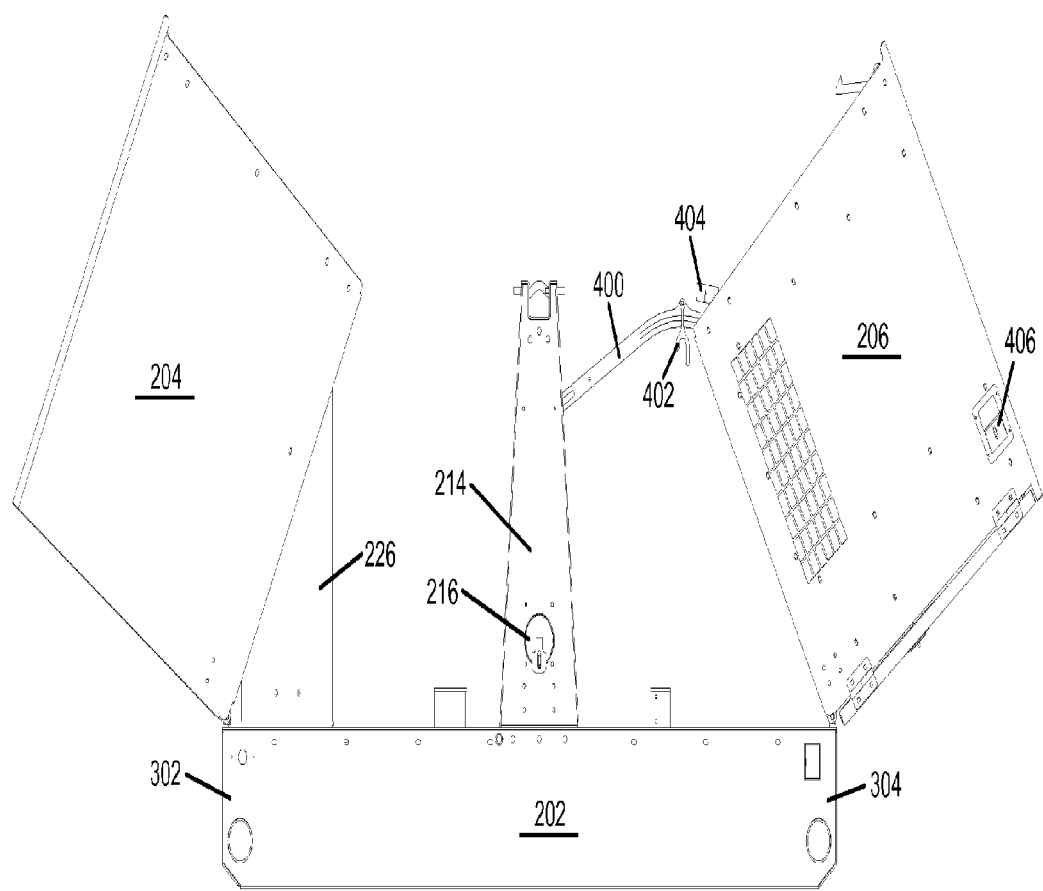
FIG. 16A is a side view of the genset of FIG. 14, with the engine and power generation components removed.
Figure 16B:
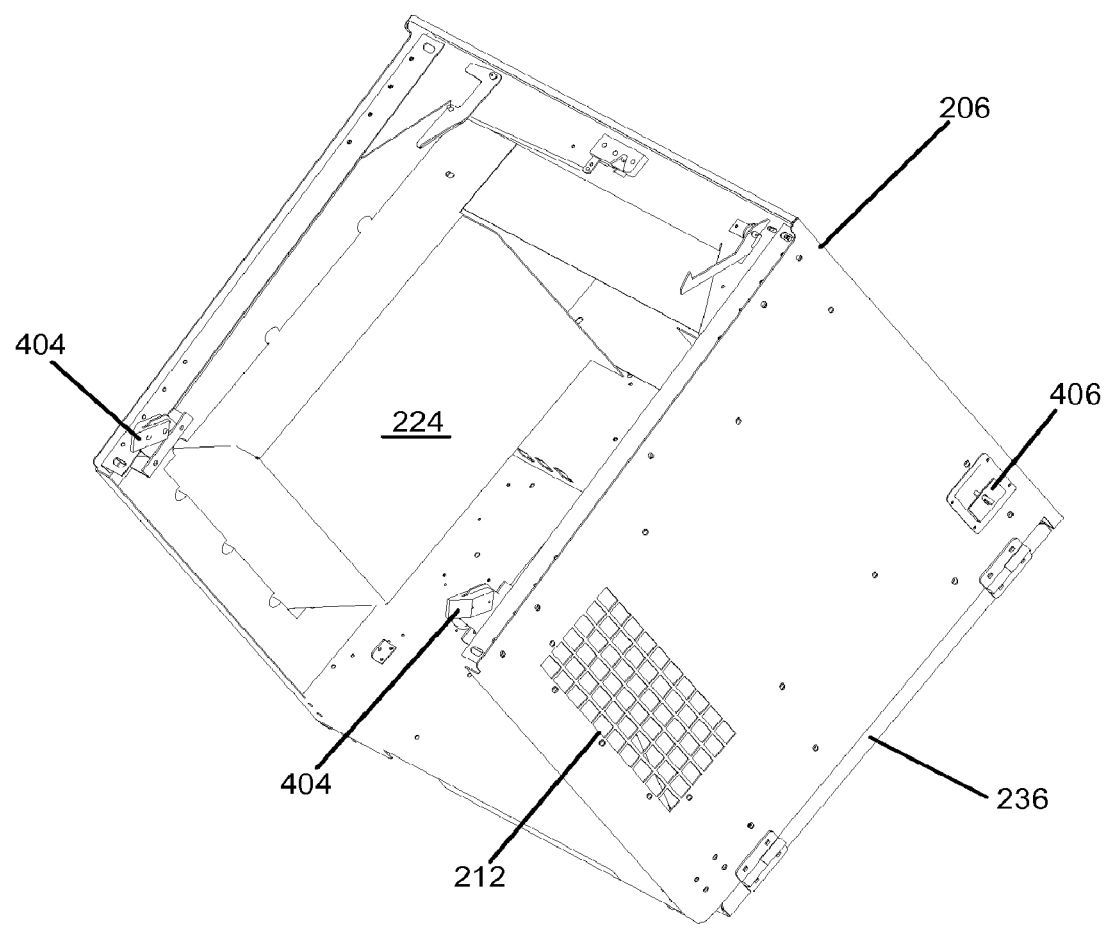
FIG. 16B is a perspective view of a second tilting access hood of the genset of FIG. 14.

Referring now to FIGS. 16, 16A and 16B, engine 208 and the generator, as well as other mechanical and electrical equipment have been removed for clarity. As can be seen, hoods 204 and 206 may be hingedly mounted by hinge pins 228 to base frame 202. A fuel tank 222 is visible, centrally located within base frame 202. A pair of hood support struts 400 may be included to support hood 206 when hood 206 is moved to the open position to permit access into the enclosure. A pair of strut support catches 404 may be included as part of hood 206 to releasably engage the struts and secure rear hood 206 in an open position. Within rear hood 206 may be ducting for handling air entering the interior of the housing through inlets 212. This ducting may providing baffling or muffling of sound from the engine or generator, reducing the noise signature of the genset. A radiator mount and air baffle may be mounted under hood 204 for directing air blown generally horizontally through radiator 218 vertically through air outlet 210.

As shown in FIGS. 14 to 16B, hoods 204 and 206 may each include a hood release 406 adjacent outer walls opposite the central arch. This location of the latch releases 406 may permit a user to actuate the latches and open or close either of the hoods while staying away from potential pinch points between the hoods 204 and 206 and the central lifting arch 214 and base frame 202. Also, by placing the latch releases 406 opposite arch 214, a user may be in a single location to unlatch one of the hoods and move the hood between open and closed positions and that single position is located where the user may have the greatest leverage for moving the hoods.

FIGS. 17 and 18 show hood 204 removed from the genset. Hood 204 may preferably be constructed of two folded and/or formed pieces of sheet material. The fewer parts required to construct hood 204 (or hood 206) the more preferable. The size of the hood and commercially available sheet stock of appropriate material may alter the number of pieces required to construct either hood. Hood 204 includes fewer pieces overall as there is no internally mounted duct work for air handling. Since hood 204 may be the more commonly or often opened of the two hoods, it may be preferable to reduce the overall weight of the hood for easier manipulation. Thus, front air ducting may be incorporated into the radiator support and the wiring and power management switches and controls may be incorporated into the rear hood. As shown, hood 204 is constructed of two elements 230 and 232. Element 230 may also include an access opening 233 formed to permit access into the interior of the enclosure without having to open the hood in which the opening is formed. A removable access or inspection plate 231 may be fastened over opening 233 to selectively permit access into the enclosure.

Element 232 is shown in FIG. 19 formed and ready for assembly with element 230 into hood 204. FIG. 20 shows a cut out blank 234 for element 232 laid out as a single panel with fold lines indicated for forming into element 232. These are shown for illustration only and are not intended to indicate more than a general approach to forming elements of and constructing a possible embodiment of front hood 204.

Figure 21:
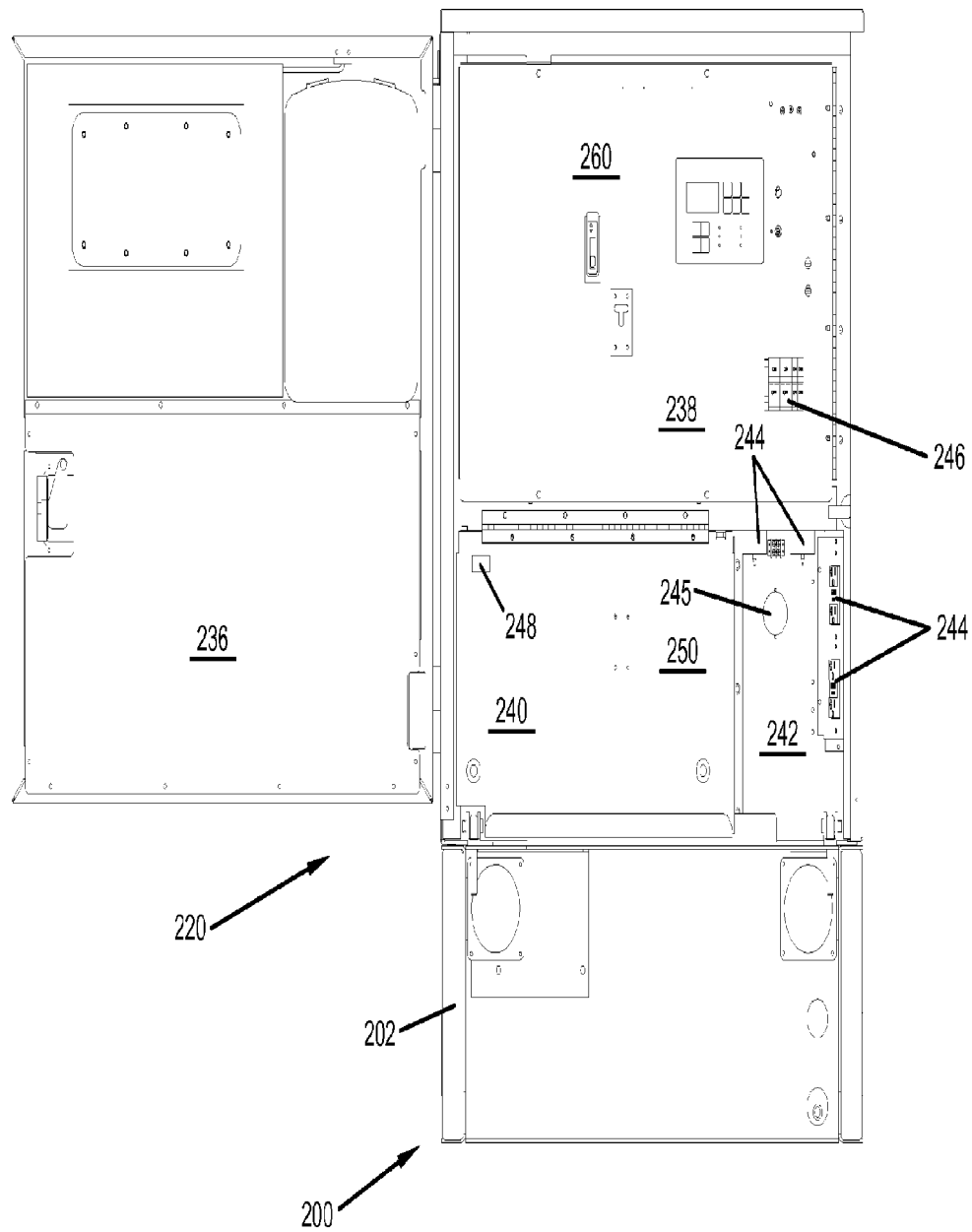
FIG. 21 is an end view of a genset according to the present disclosure with a first access door open to allow access to a genset control panel.

Referring now to FIG. 21, rear panel 220 of genset 200 includes a general access door 236 covering three distinct areas: a wiring and operational controls area 238, a phase switching and power connection area 240 and a general outlet and fuse area 242. Area 242 provides one or more outlets 244 for easy connection and disconnection of appliances or tools that may be connected or disconnected without shutting genset down. Different formats of these outlets are provided for different voltages and amperages that may be provided through the outlets. A power inlet 245 is also included in area 242 so that power may be for emergency startup, for charging batteries, and for keeping the engine warm for quicker online response. Fuses 246 may provide current protection outlets 244 and power inlet 245.

Area 240 houses power connections for larger draw devices or cables, such as might be run to electrical distribution panels or large electrical installations. Area 240 also houses a phase switch, allowing the characteristics and voltage of power generated by genset 200 to be altered. The status of the current phase setting may be visible through a window 248. However, as it may damage genset 200 or attached equipment to change the phase setting of genset 200 while power is being generated, the phase selector switch is covered by a protective panel 250. It is also not advisable to connect or disconnect cables to the high draw power connections covered by panel 250 when genset 200 is operating, as undesirable spikes or alterations of the voltage or power curve can be generated. It may also not be advisable to have a user touching or otherwise manipulating these power connections under load, for worker safety reasons.

Figure 22:
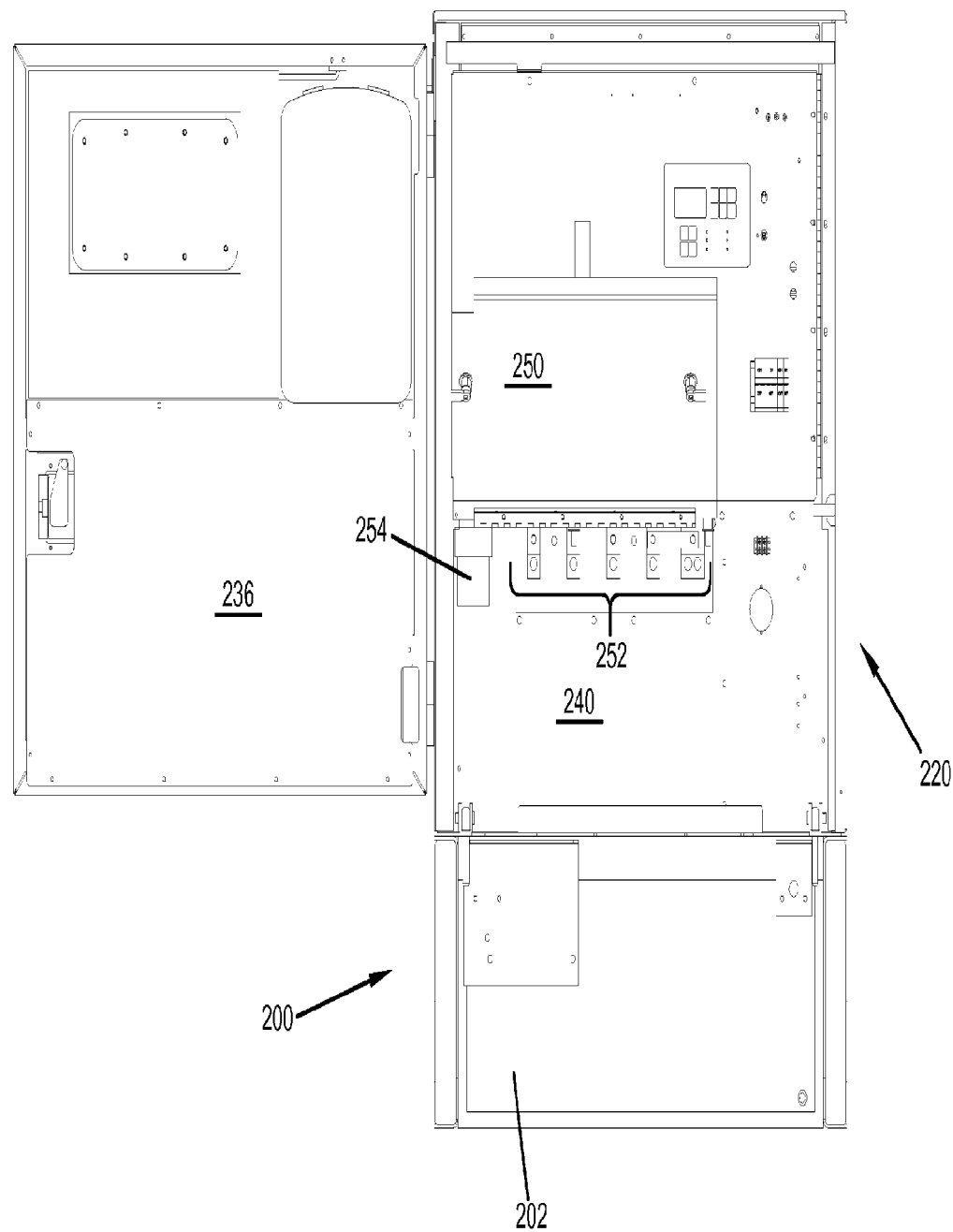
FIG. 22 is an end view of the genset of FIG. 21, with a second access door open to allow access to power connections and phase switches.

FIG. 22 shows panel 250 in an open position, providing access to phase switch 254 and power connections 252. A plurality of power connectors 252 are provided so that particular power connections may be configured as required for a particular jobsite or installation. A plurality of different power connection formats may also be provided so that power can be fed to a variety of devices without having to rewire the connectors of any of those devices. It may be unlikely that all of the provided power connection points would used in any particular job site or installation, but this helps ensure that an appropriate available power connection should be available.

Referring now also to FIGS. 23 to 25, panel 250 includes one or more switches 256 to sense when panel 250 has been moved from its position covering the phase switch or the power connections. When panel 205 is opened to access either the phase switch or the power connections, the switches shut genset 200 down to prevent possible damage to equipment or personnel. Switches monitoring panel 205 may also provide that power delivery to all power outlets or connections is shut off immediately upon movement of panel 250, while letting engine 208 continuing to run. As shown, panel 250 is hingedly connected to rear panel 220 at an upper edge 258, so that a default position for panel 250 will be a closed position, protecting switch 254 and connections 252.

Figure 26:
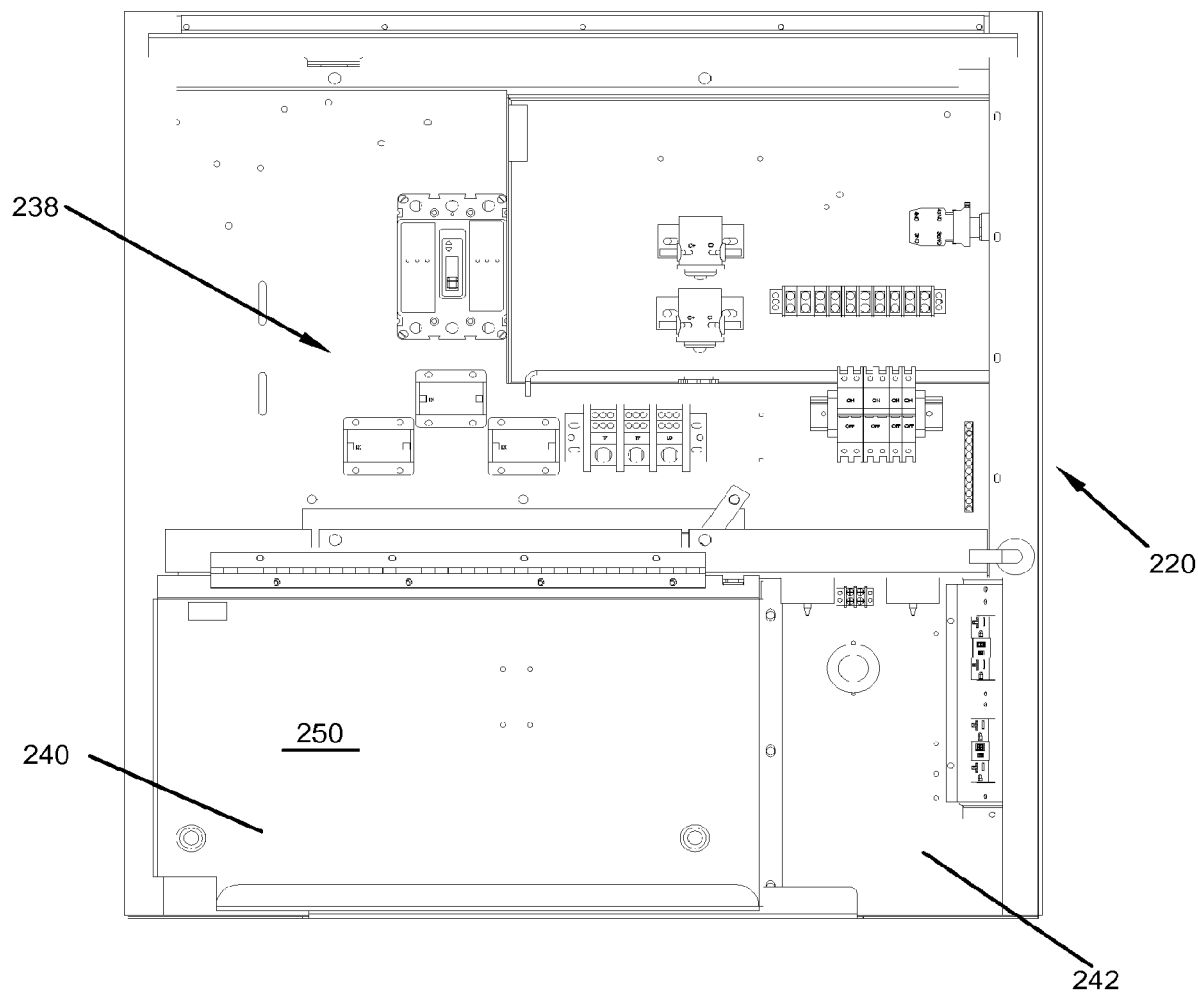
FIG. 26 is an end view of a rear panel of a genset according to the present disclosure, with a wiring enclosure exposed.
Figure 27:
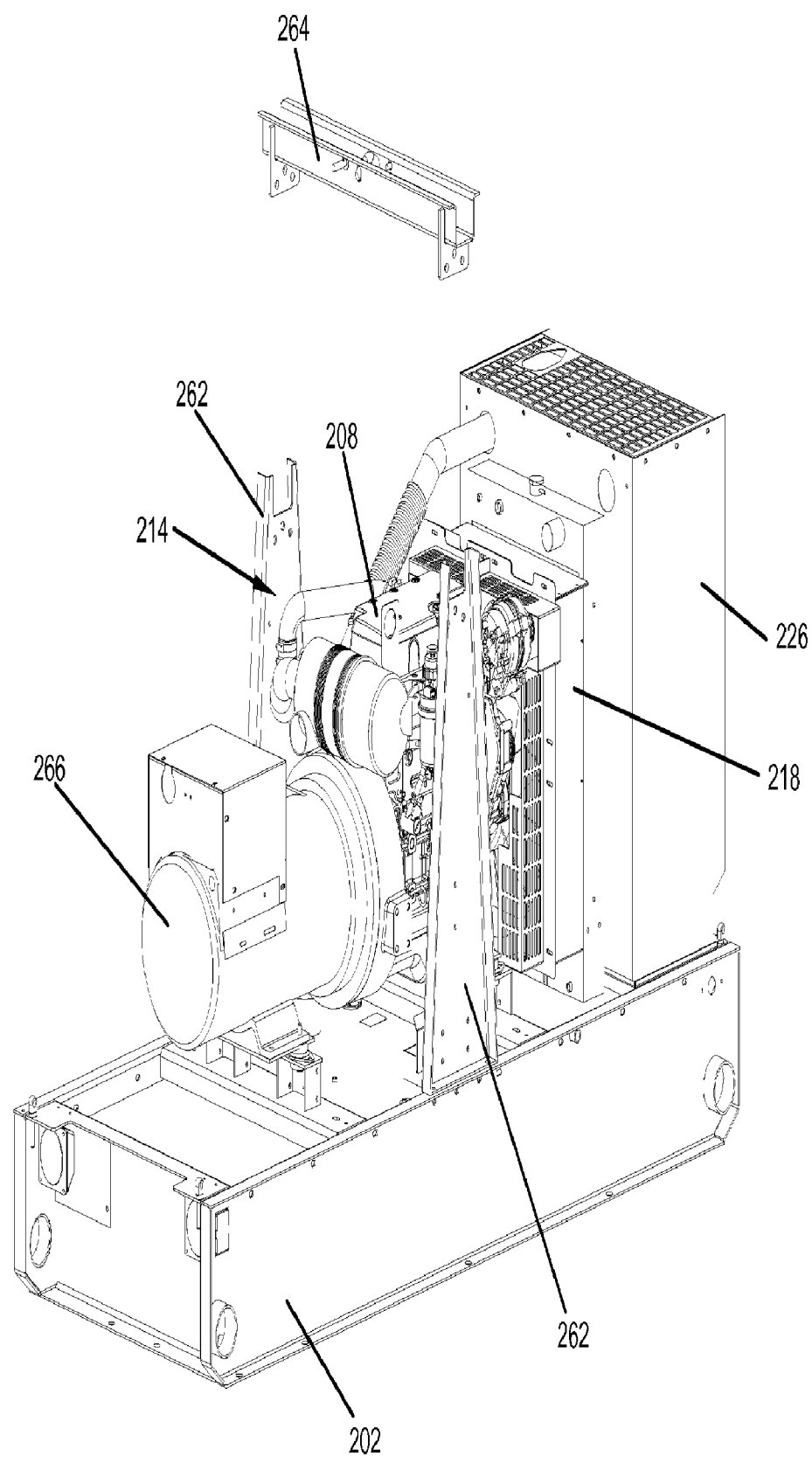
FIG. 27 is a side perspective view of a genset according to the present invention, with the housing and wiring removed and showing a removable top of a central lifting arch.
Figure 28:
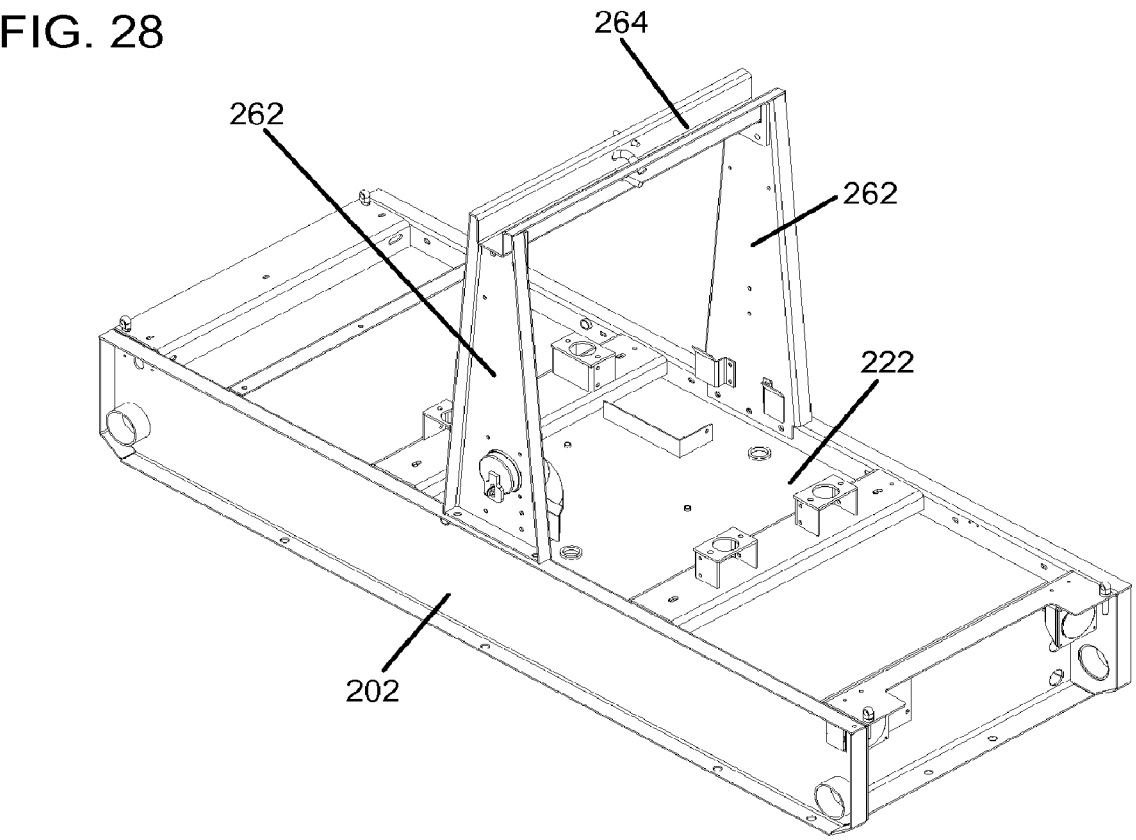
FIG. 28 is a perspective view of base frame and central lifting arch according to the present disclosure.
Figure 29:
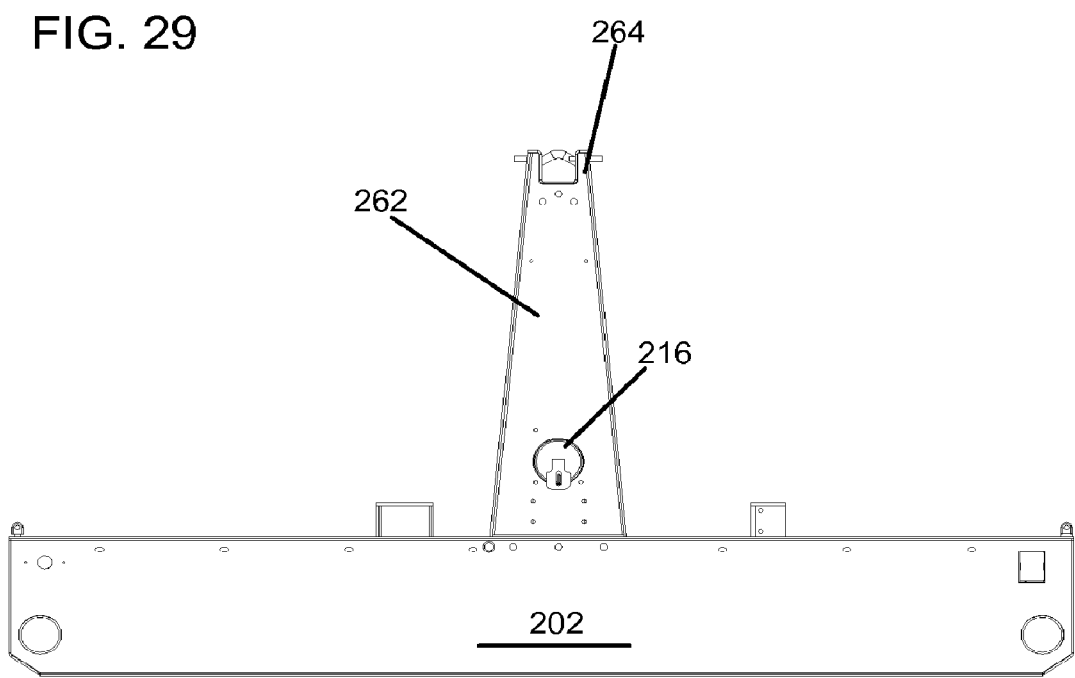
FIG. 29 is a side view of the frame and arch of FIG. 28.
Figure 30:
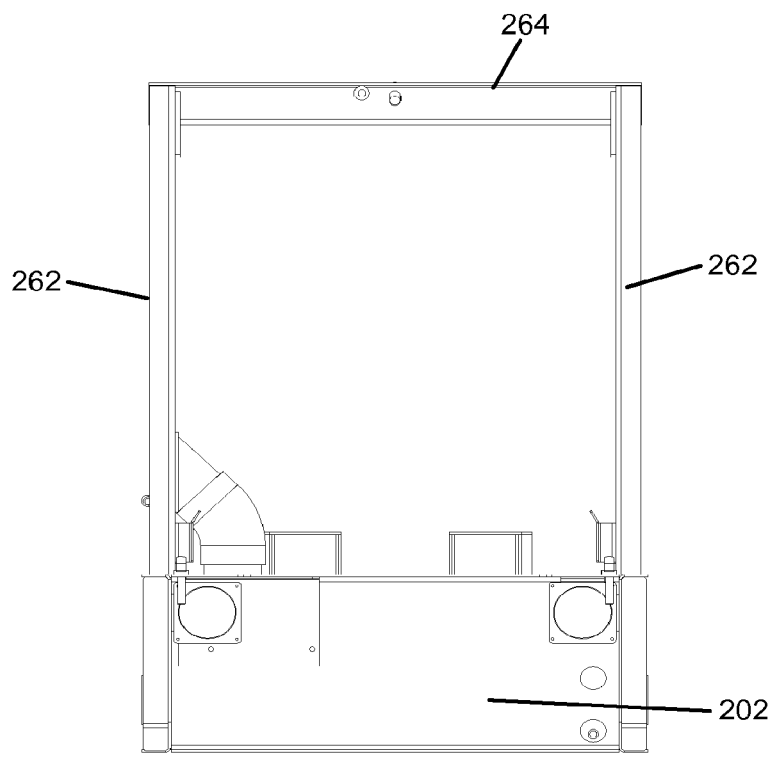
FIG. 30 is an end view of the frame and arch of FIG. 28.
Figure 31:
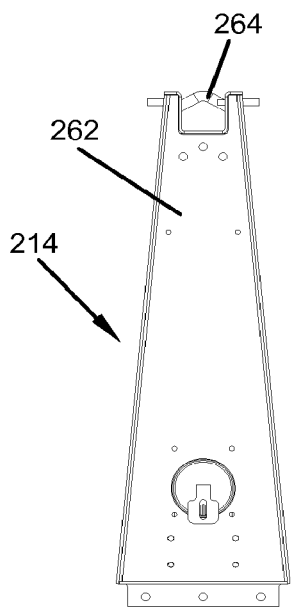
FIG. 31 is a side view of the lifting arch of FIG. 28.
Figure 32:
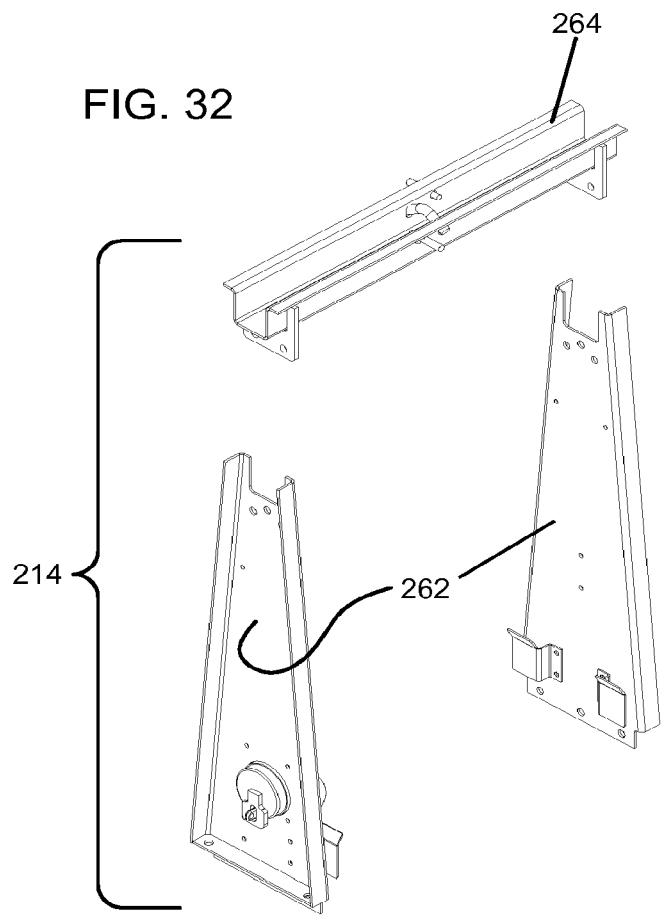
FIG. 32 is an exploded perspective view of the lifting arch of FIG. 31.

FIG. 26 illustrates rear panel 220 with wiring and operational controls area 238 uncovered. Area 238 is configured to house as many of the internal electrical connections and as much of the wiring and device controls as possible. To simplify assembly or maintenance, it is preferable to reduce the number of connections that need to be made between rear hood 206 and engine 208 and the generator. This permits hood 206 to be wired and fully assembled off the genset assembly line in a more efficient and protected environment. The hood can be brought to the genset during assembly and preferably wired to the generator, the battery and the engine with preconnectorized fittings. This also may simplify maintenance as the number of wiring harnesses extending through the operational area of the generator and the engine, and thus exposed to more environmental hazards, may be reduced. Disconnection and removal of rear hood 206 can be easily performed when required for repair or replacement of the generator or engine and reconnects to a new or repaired generator or engine can also be easily and quickly accomplished.

Engine controls, circuit protection devices, wiring of different configurations to the generator to match the selected phase or power settings of phase switch 254, as well as operational and diagnostics devices and displays may all be housed within area 238. It may be desirable that a covering panel 260 (shown in FIG. 21) may include similar cutoff switches to panel 250, so that opening panel 260 to access area 238 will also shut down genset 200 for safety reasons.

Referring now to FIGS. 27 to 32, central lifting arch 214 includes a pair of vertical support braces 262 and a generally horizontal cross brace 264. Hoods 204 and 206 may not provide sufficient structural support to permit lifting of genset 200 as might have been accomplished with the prior art genset 10 of FIGS. 1 to 4.

Lifting arch 214 extends upward between the two hoods to provide a lifting point with sufficient strength to allow for a crane or other machine to lift and position genset 200. To improve access to engine 208 and a generator 266 mounted to base frame 202, cross brace 264 may be removable. If engine 208 or generator 266 need to be removed for repair or replacement, cross brace 264 can be removed and the engine and generator may be simply lifted vertically from frame 202. Hoods 204 and 206 may be configured to extend far enough in the open position that neither hood need sot be removed to lift the engine and generator from the frame. Alternatively, removal of hoods 204 and 206 may be necessary to remove the engine or generator. The prior art genset 10 required that the engine or generator be removed sideways from the frame and/or the fixed portions of the housing be disassembled prior to removing or replacing the engine or generator.

Although not apparent from the FIGS., genset 10 included a lifting fully enclosed by the housing with only a lifting eye extending through the housing. Even if a portion of the lifting arch were removable, the housing would still need to be disassembled to uncover the arch for removal.

Figure 33:
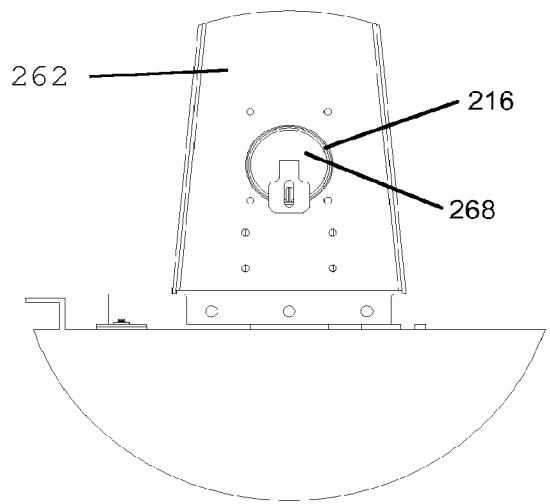
FIG. 33 is a side view of a fueling arrangement integrated in a lifting arch according to the present disclosure.
Figure 34:
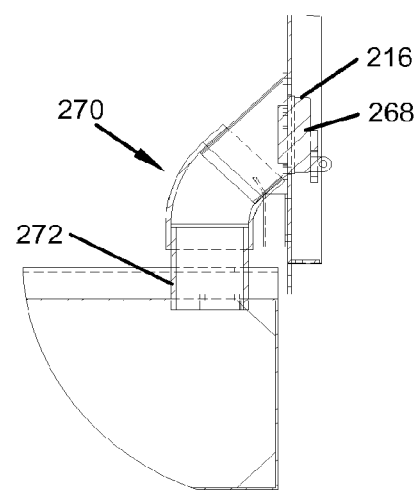
FIG. 34 is a cross-sectional view of the fueling arrangement of FIG. 33.
Figure 35:
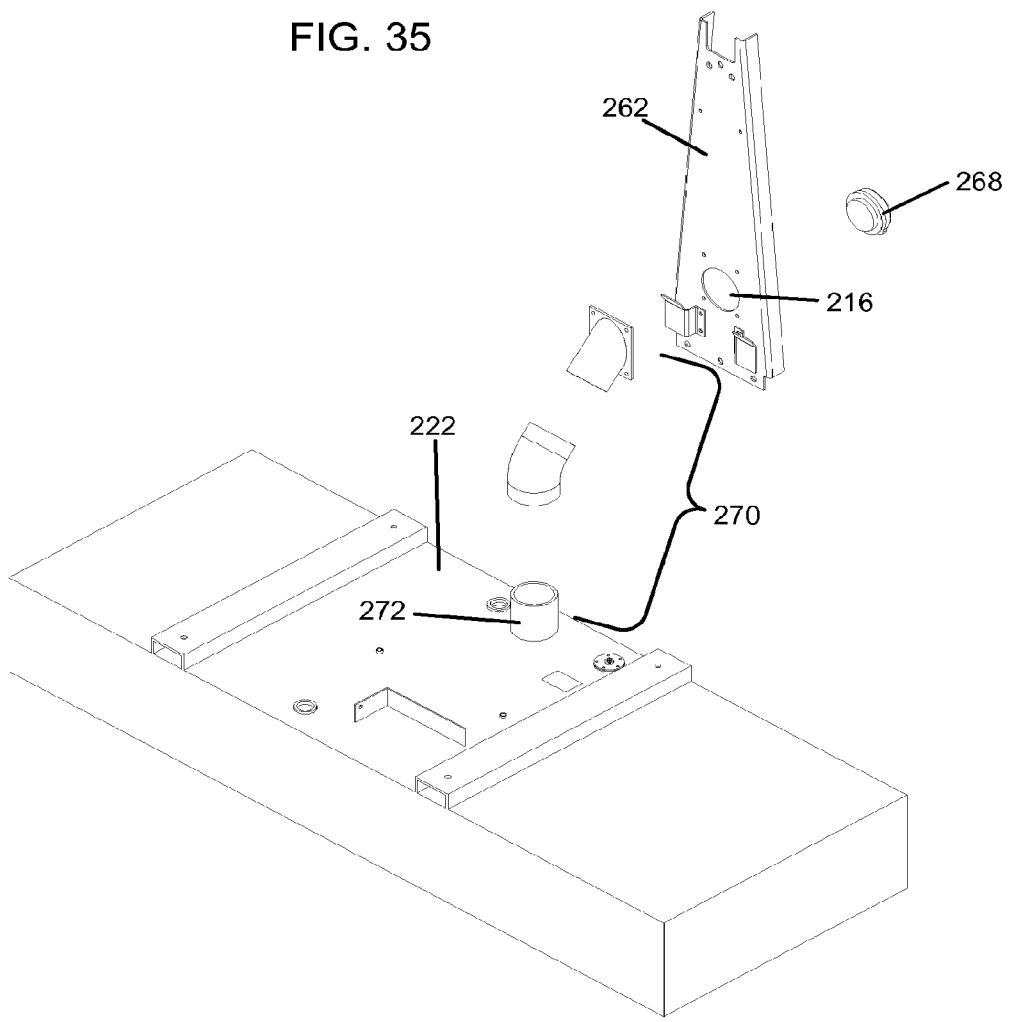
FIG. 35 is an exploded perspective view of the fueling arrangement of FIG. 33.

FIGS. 33 to 35 illustrate an approach to providing a fuel inlet to tank 222 that is secure and protected by one of the vertical support braces 262. Another feature of the fuel inlet assembly is that it allows use of a one-eighth, one-quarter, or similar fuel cap 268 or an expanding plug type fuel cap, providing a secure and easily removable cover to the fuel inlet and opening 216. The remaining pieces of fuel path 270 may also slip fit, so that vertical support 262 can be assembled to frame 202 without preassembly of fuel path 270. Once vertical brace 262 is mounted to frame 202 and fuel tank 222 is mounted within frame 202, the fuel path 270 can be assembled in place, accounting easily for any misalignment or manufacturing tolerances in the location of opening 216 or tank inlet 272. Also, an outer surface of fuel cap 268 may be set inwardly from the outer edge of frame 202, permitting frame 202 to protect fuel cap from being hit by other adjacent vehicles or trailers during transport or on a job site.

Figure 36:
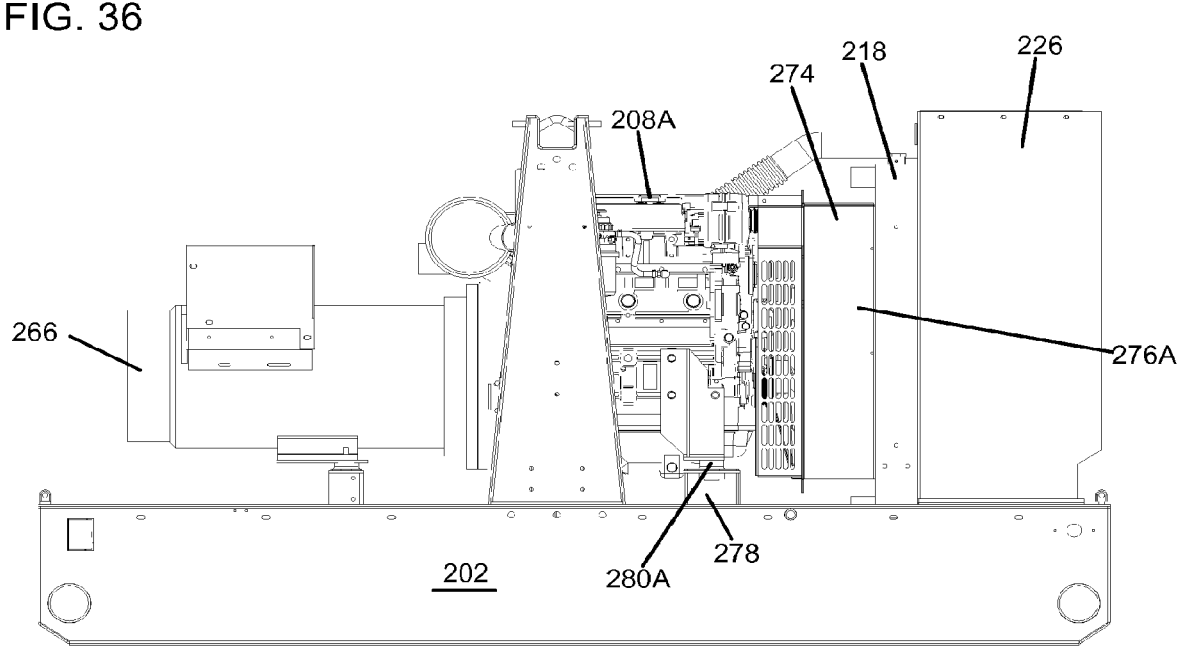
FIG. 36 is a side view of a genset according to the present disclosure with the housing removed and a first engine mounted to the base frame, the first engine including a crankshaft mounted cooling fan.
Figure 37:
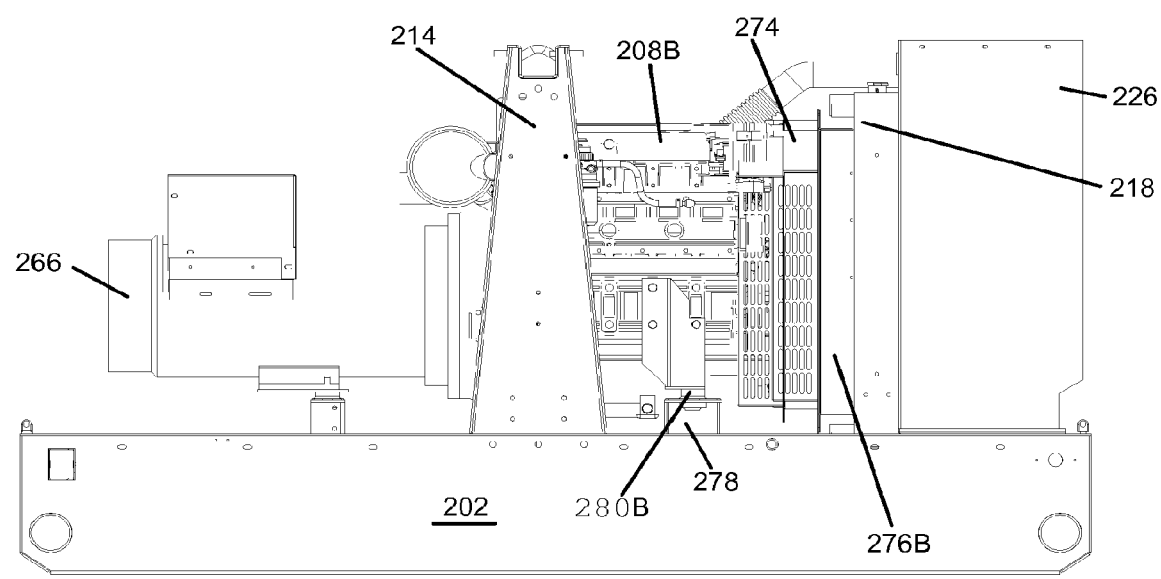
FIG. 37 is a side view of the genset of FIG. 36, with a second engine mounted to the base frame, the second engine including a crankshaft mounted cooling fan.

FIGS. 36 and 37 illustrate genset assemblies according to the present disclosure which are essentially the same except for the engines being of slightly different sizes, such as similar rated engines from different manufacturers. It is not uncommon for gensets of the same rating to include engines from different manufacturers, as the engines may be sourced at different times, new engine models may be introduced and older engine models may be discontinued. It is desirable that as much as possible of the structure and arrangement of genset 200 be fixed regardless of the particular engine used, for manufacturing efficiency and ease of maintenance.

In the two assemblies shown in FIGS. 36 and 37, engines 208A and 208B are connected to generator 266 and to radiator 218. The positions of generator 266 and radiator 218 is the same on frame 202 for each assembly. However, engines 208A and 208B have different vertical and horizontal dimensions. Engine supports 278 on frame 202 are topped by engine mounts 280A and 280B, to interface with engines 208A and 208B, respectively. This means that only engine mounts 280 need to be switched to position different engines 208 on frame 202. The goal for changing the engine mounts is to ensure that the crankshaft for each engine will be mounted at the same height to interface with the generator and the radiator.

Since engines 208A and B have different lengths, the relationship of a crankshaft mounted cooling fan for each engine, while the same height due to different engine mounts, may be at different distances from radiator 218. A common fan shroud 274 is mounted over the fan to enclose the fan and direct airflow from the fan through radiator 218. As the fan of each engine is crankshaft mounted and fixed relative to the engine, shroud 274 needs to be positioned at fixed location with respect to the engine. Different engine lengths mean that the fans are different distances from radiator 218 and thus the shroud will be at different distances from radiator 218. Variable length extensions 276A and 276B are provided to direct air from shroud 274 through radiator 218, regardless of the distance the engine, and thus the crankshaft mounted fan, are from radiator 218.

Alternatively, length of the crankshaft of the engine can be altered so that the position of the fan for any particular engine is in a desired location with respect to radiator 218. This altered shaft length would permit a common shroud 274 and extension 276 to be used for all engine configurations.

Figure 38:
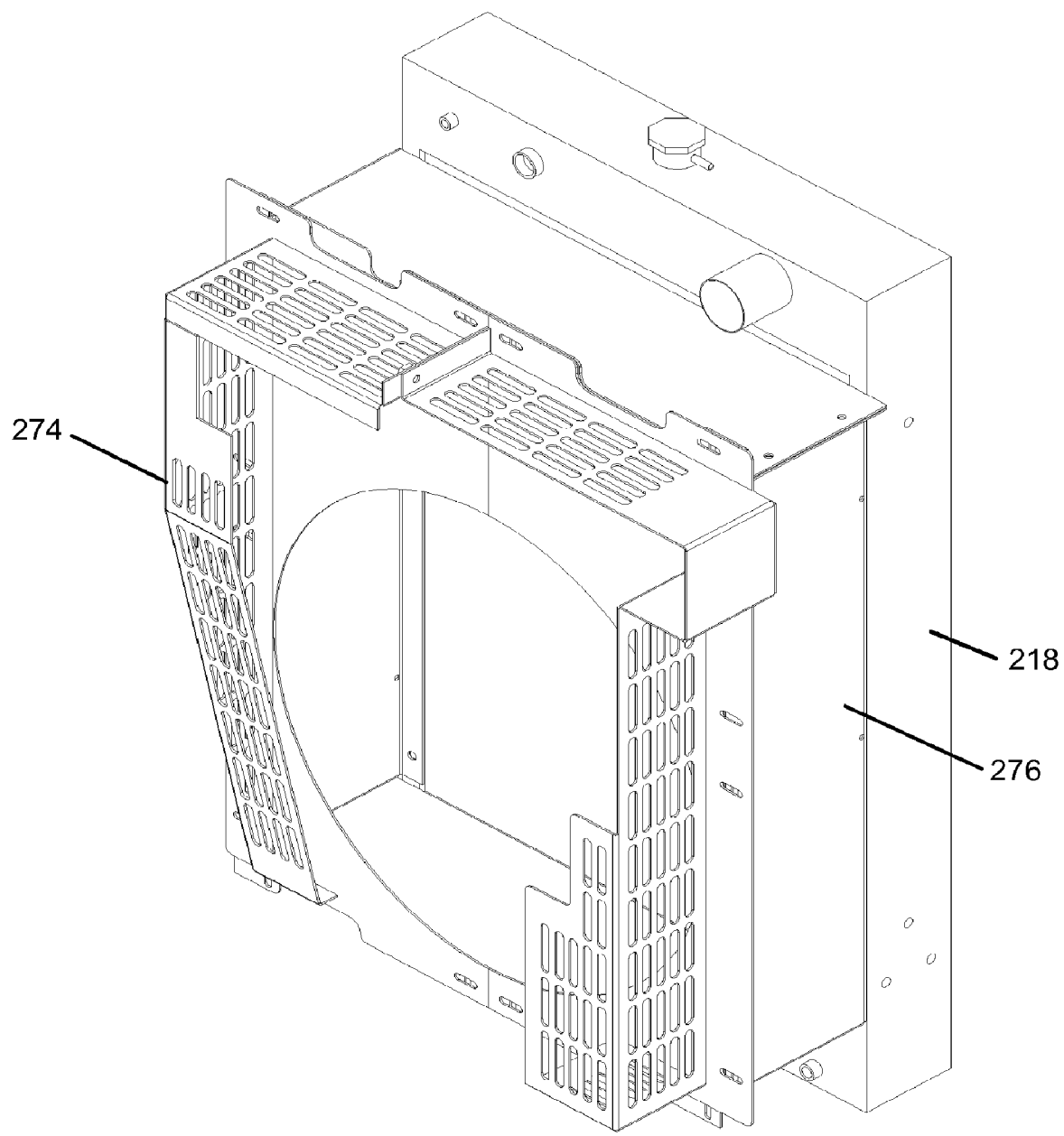
FIG. 38 is a perspective view of the fan shroud and radiator of the genset of FIG. 36.
Figure 39:
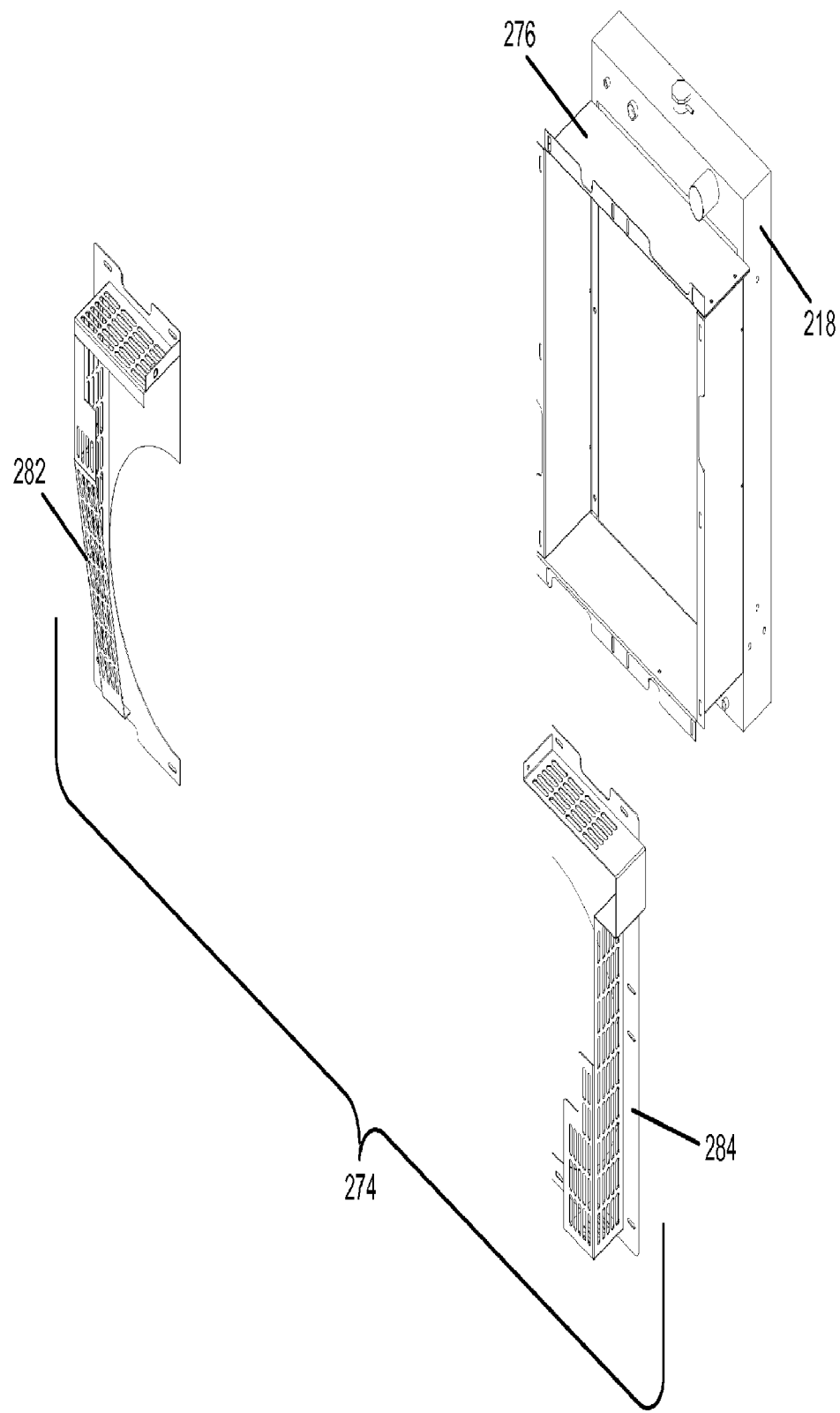
FIG. 39 is a partially exploded perspective view of the fan shroud of FIG. 38.

FIG. 38 illustrates the assembly of radiator 218, shroud 274 and extension 276. Since it may be desirable to remove engine 208, 208A or 208B from a genset without removing the radiator, FIG. 39 illustrates that shroud 274 is formed in two pieces 282 and 284. Any of the engines can be removed with disturbing radiator 218 be separating pieces 282 and 284 from about the crankshaft mounted fan and removed from the genset.

Figure 40:
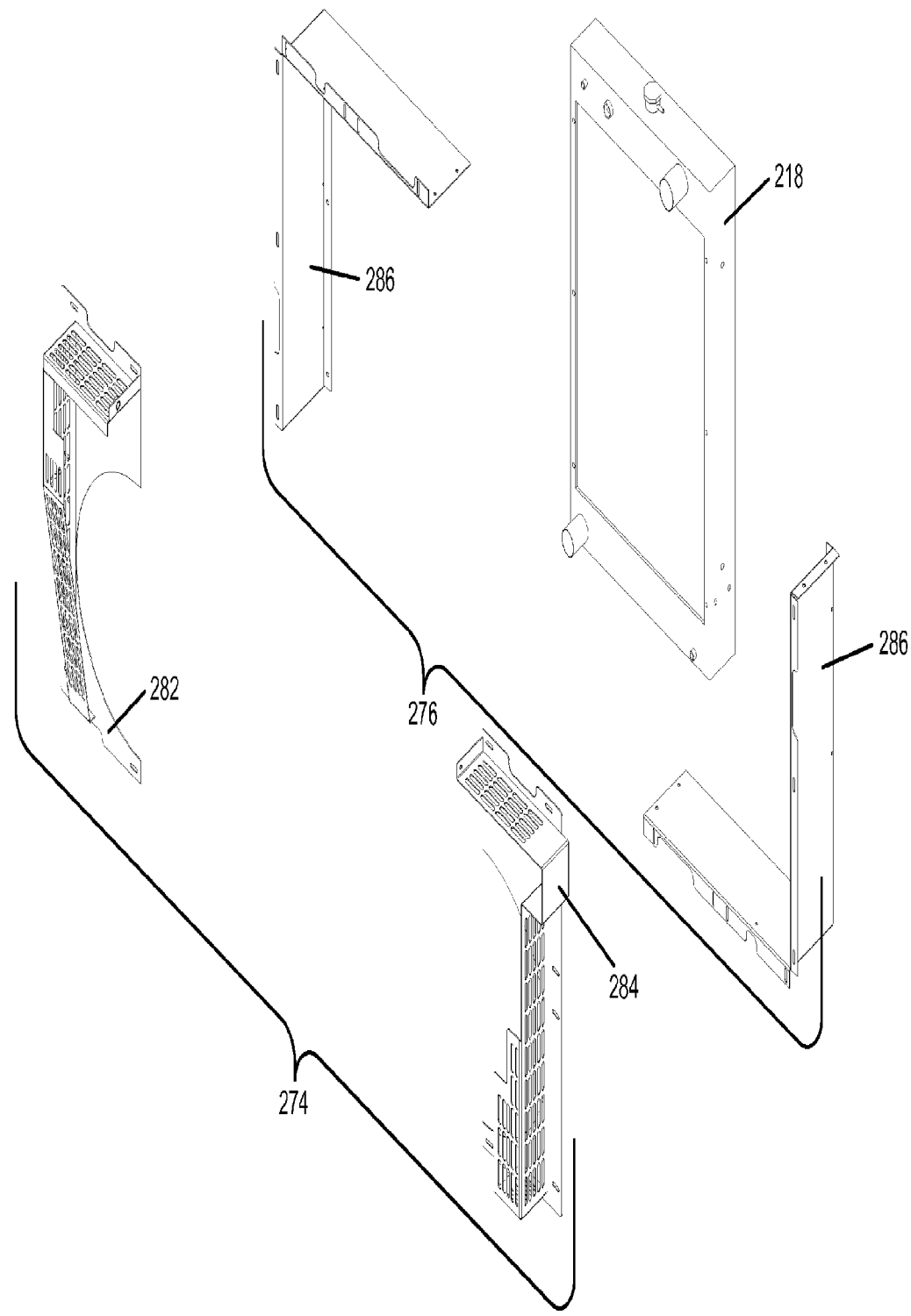
FIG. 40 is an exploded perspective view of the fan shroud of FIG. 38.

Similarly, as seen in FIG. 40, extension 276 may also be configured as a two piece unit. As shown, extension is configured as two identical pieces 286 which can be varied in length as needed for a particular genset and engine configuration. By configuring shroud 274 and extension 276 in two pieces, as shown, complete access to any fan belts or other engine maintenance or service items adjacent radiator 218 and the crank shaft mounted fan can be provided.

What is claimed is:

1. A portable generator comprising:
   a frame with a first end and a second end;
   an engine mounted to the frame adjacent the first end and an electrical generator mounted to the frame adjacent the second end, the engine and generator mounted to each other so that operation of the engine will actuate the generator to generator electrical current;
   a first hood hingedly attached to the frame at the first end, the first hood movable between a closed position covering the engine and an open position allowing access to the engine;
   a second hood hingedly attached to the frame at the second end, the second hood movable between a closed position covering the generator and defining an enclosure, and an open position allowing access to the generator;
   the engine and generator removable from the frame generally vertically with the first and second hoods in their respective open positions;
   a lifting arch attached to the frame between the first and second hoods, the lifting arch including a lifting attachment point accessible when both hoods are in their respective closed positions, the lifting arch comprising a pair of vertical supports extending upward from the frame and a top end opposite the frame, and a crosspiece extending between the top ends of the vertical supports, the crosspiece removably mounted to the vertical supports.

2. The portable generator of claim 1, further comprising a fuel tank for the engine mounted within the frame and including a filling tube extending through one of the vertical supports.

3. The portable generator of claim 1, the second hood further comprising a door covering a power outlet area and a power connection area, and a protective panel covering the power connection area with a plurality of power connection terminals through which electrical current from the generator may be accessed, wherein the door is movable between a closed position and an open position during operation of the portable generator, and wherein moving the panel from a closed position to an open position during operation of the portable generator will halt electrical current flowing to the power connection terminals.

4. The portable generator of claim 3, further comprising a phase and voltage switch accessible within the power connection area when the panel is in the open position.

5. The portable generator of claim 1, the first hood further comprising an air outlet permitting air from within the enclosure to escape when the hoods are in their respective closed positions, the frame further comprising a radiator mounted adjacent the first end, the radiator positioned so that air flowing from the enclosure through the air outlet will pass through the radiator.

6. The portable generator of claim 5, the engine further comprising a crankshaft mounted fan, the frame further comprising a shroud positioned about the fan and an extension mounted to the radiator adjacent the shroud, the shroud and the extension cooperating to direct air from the fan through the radiator.

7. The portable generator of claim 6, wherein the extension is selected from one of a plurality of extensions sized to permit each of a plurality of different sized engines to be mounted to the frame.

8. The portable generator of claim 1, further comprising a tongue pivotably mounted to the frame adjacent the first end of the frame, the tongue including a hitch end and a frame end, the tongue pivotable between a first extended generally horizontal position and a second storage generally vertical position.

9. The portable generator of claim 1, further comprising:
   an axle mounted to the frame between the first end and the second end with a wheel mounted to opposite ends of the axle;
   a tongue including a hitch end and a frame end, the tongue pivotably mounted to the frame with the frame end adjacent the first end, the hitch end configured to engage a trailer hitch;
   the tongue pivotable between a first extended position with the hitch end positioned to engage a trailer hitch and a second storage position with the tongue extending generally vertically from the first end of the frame.

10. The portable generator of claim 9, further comprising a jockey wheel mounted adjacent the first end of the frame, the jockey wheel cooperating with the wheels of the axle to support the frame when the tongue is in the storage position.

* * * * *